United States Patent
Yamauchi et al.

(10) Patent No.: US 7,200,297 B2
(45) Date of Patent: Apr. 3, 2007

(54) DEVICE USING A VIRTUALLY-IMAGED PHASED ARRAY (VIPA) WITH AN IMPROVED TRANSMISSION WAVE CHARACTERISTIC OF OUTPUT LIGHT

(75) Inventors: Yasuhiro Yamauchi, Kawasaki (JP); Yuichi Kawahata, Kawasaki (JP); Nobuaki Mitamura, Sapporo (JP); Hirohiko Sonoda, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/278,868

(22) Filed: Oct. 24, 2002

(65) Prior Publication Data
US 2003/0185504 A1 Oct. 2, 2003

(30) Foreign Application Priority Data
Mar. 29, 2002 (JP) ............................. 2002-097834

(51) Int. Cl.
*G02B 6/26* (2006.01)
*G02B 27/00* (2006.01)
(52) U.S. Cl. ........................... 385/15; 385/31; 359/578
(58) Field of Classification Search ................ 385/15, 385/27, 31, 33–38, 47
See application file for complete search history.

(56) References Cited

U.S. PATENT DOCUMENTS

| | | | |
|---|---|---|---|
| 5,930,045 A | 7/1999 | Shirasaki | |
| 5,973,838 A | 10/1999 | Shirasaki | |
| 6,028,706 A | 2/2000 | Shirasaki et al. | |
| 6,296,361 B1 * | 10/2001 | Shirasaki et al. | 359/868 |
| 6,343,866 B1 * | 2/2002 | Cao et al. | 359/868 |
| 6,556,320 B1 * | 4/2003 | Cao | 398/65 |
| 6,714,705 B1 * | 3/2004 | Lin et al. | 385/37 |
| 6,832,020 B2 * | 12/2004 | Okada et al. | 385/31 |
| 2001/0007605 A1 | 7/2001 | Inagaki et al. | |
| 2003/0016908 A1 * | 1/2003 | Okada et al. | 385/31 |
| 2005/0041921 A1 * | 2/2005 | Okada et al. | 385/31 |

FOREIGN PATENT DOCUMENTS

| | | |
|---|---|---|
| JP | 11-223745 | 8/1999 |
| JP | 2000-28849 | 1/2000 |
| JP | 2000-511655 | 9/2000 |
| JP | 2001-197003 | 7/2001 |

OTHER PUBLICATIONS

Deformable Mirror, Specification, p. 1 along with English translation, no date.

* cited by examiner

*Primary Examiner*—Michelle Connelly-Cushwa
(74) *Attorney, Agent, or Firm*—Staas & Halsey LLP

(57) ABSTRACT

A dispersion compensator comprising a VIPA is configured so as to reflect light with each wavelength at an angle varying depending on wavelength when the light is reflected off a mirror. When being coupled at the end of an input fiber, the light with each wavelength is coupled at a specific angle. If the light is coupled with the fiber at a specific angle, coupling efficiency degrades. Therefore, in this case, coupling loss increases. Light having a wavelength with high transmittance in the VIPA is coupled with the fiber at a large angle, while light with a low transmittance is efficiently coupled with the fiber at a small angle or no angle. In this way, the round-top wavelength characteristic of the VIPA can be leveled.

14 Claims, 35 Drawing Sheets

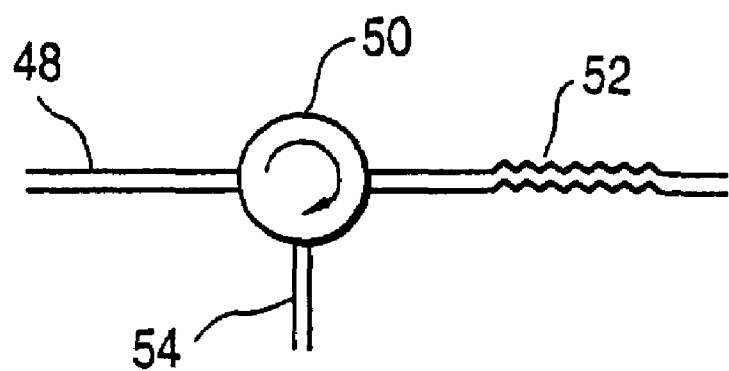
F I G. 1

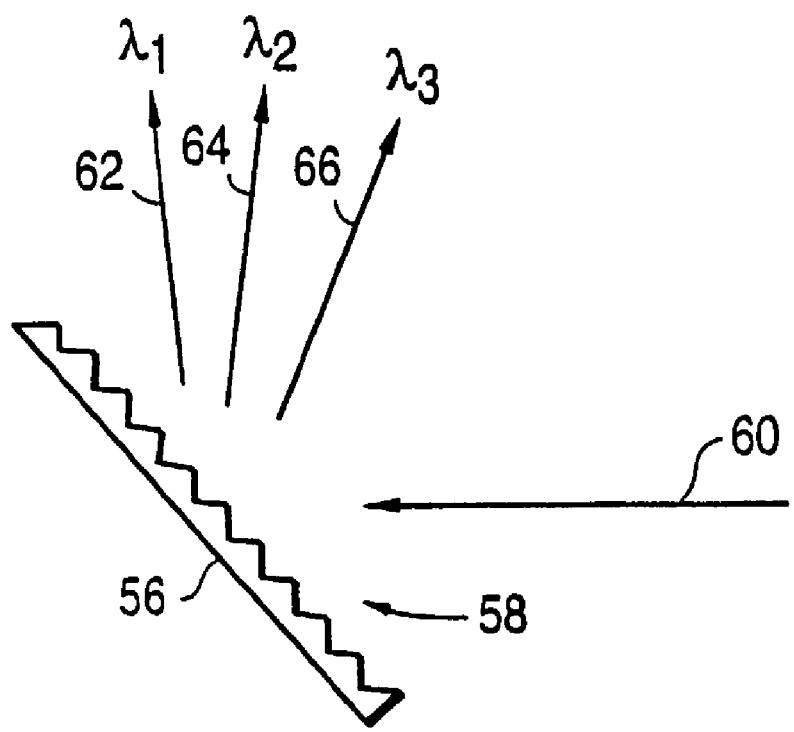
F I G. 2

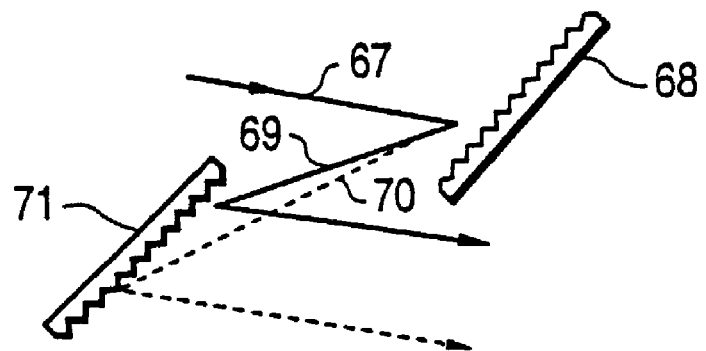
F I G. 3 A
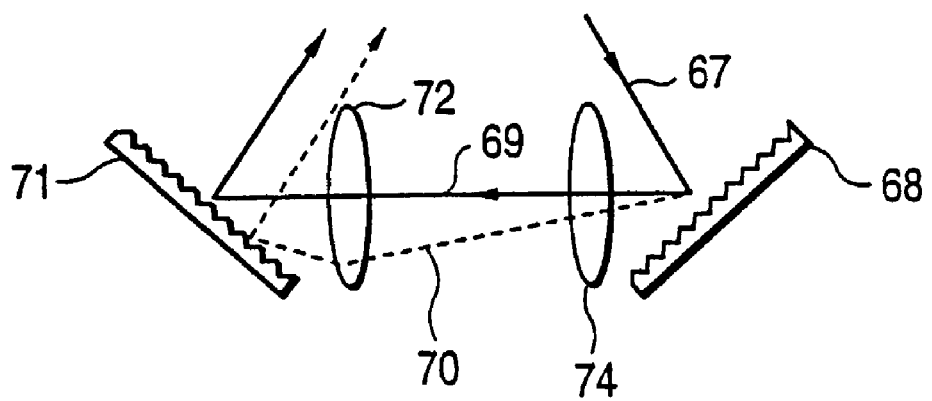
F I G. 3 B

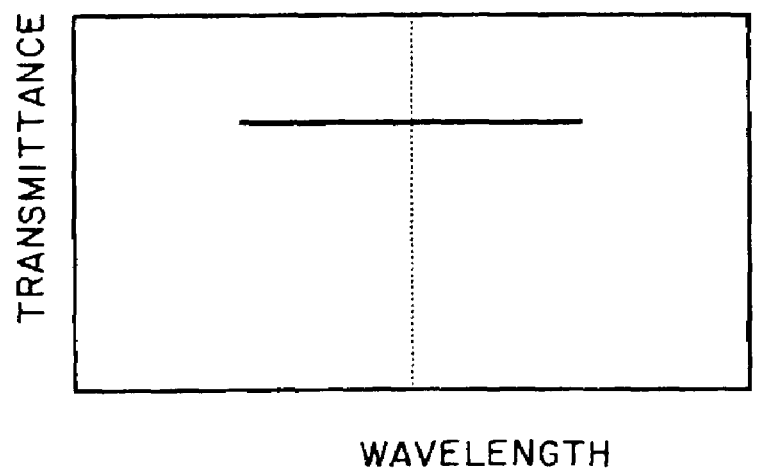
F I G. 6

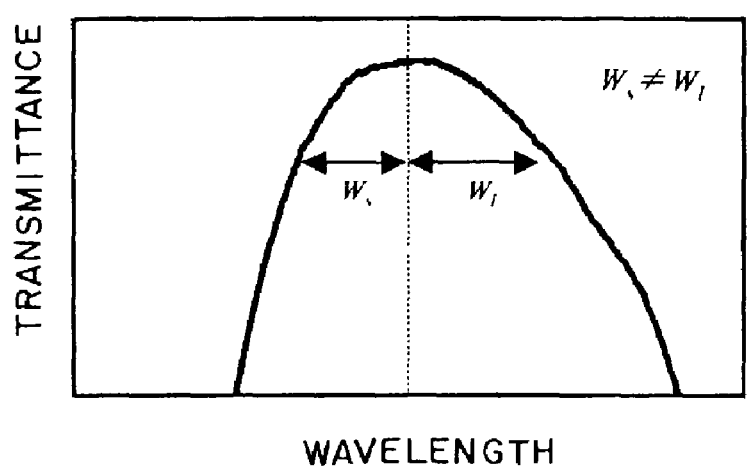
F I G. 7

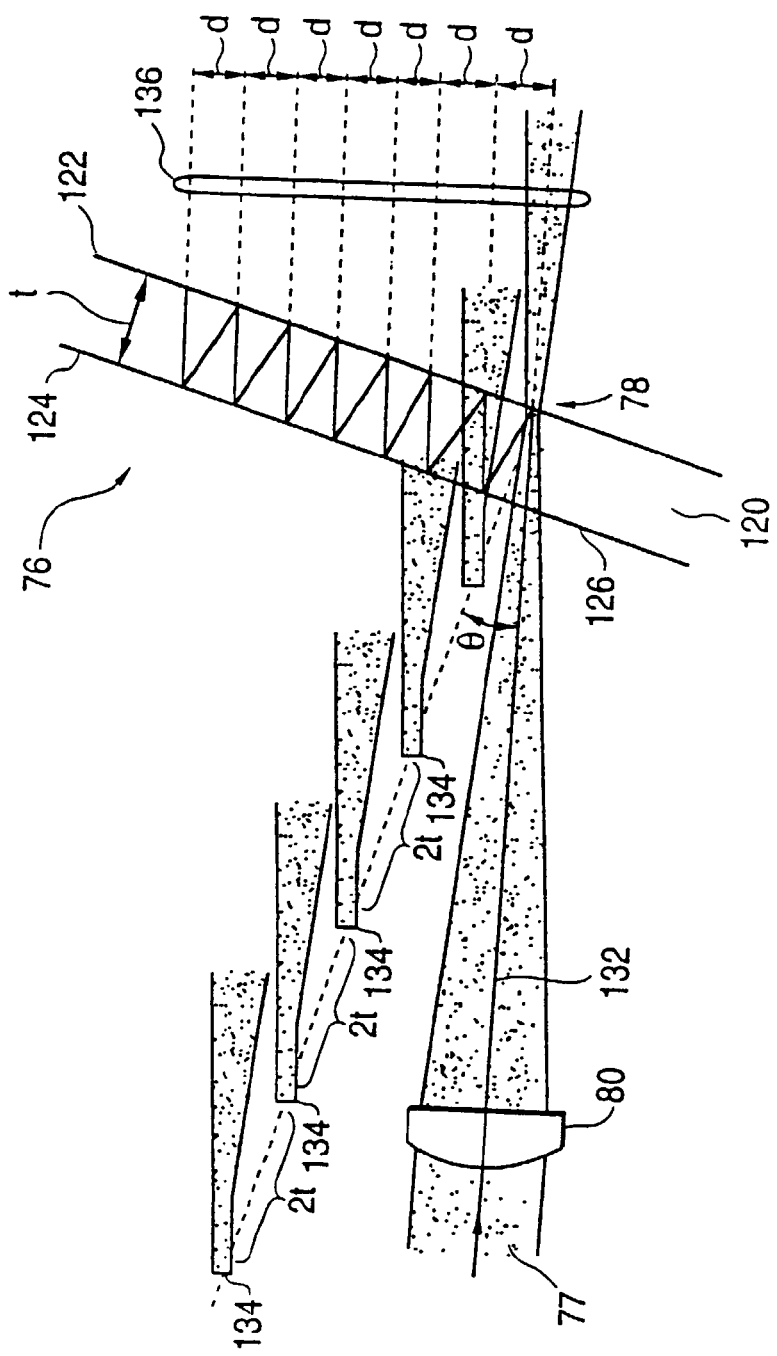
F I G. 9

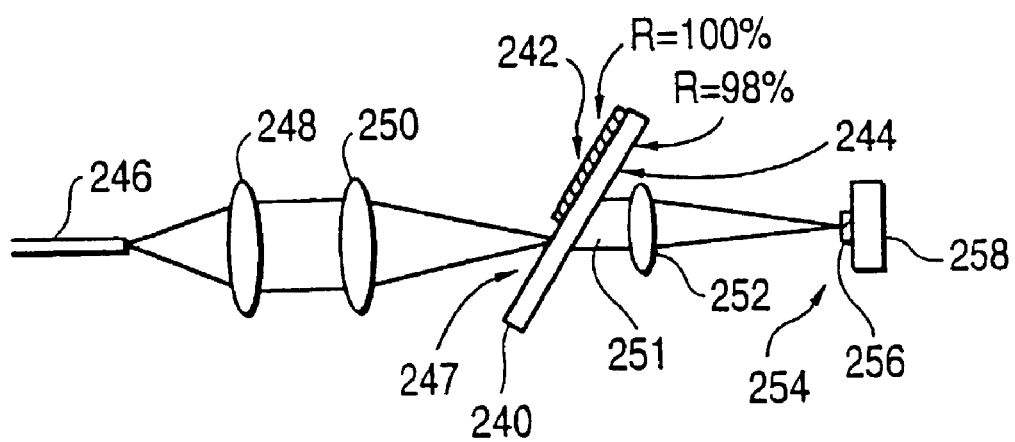
F I G. 14

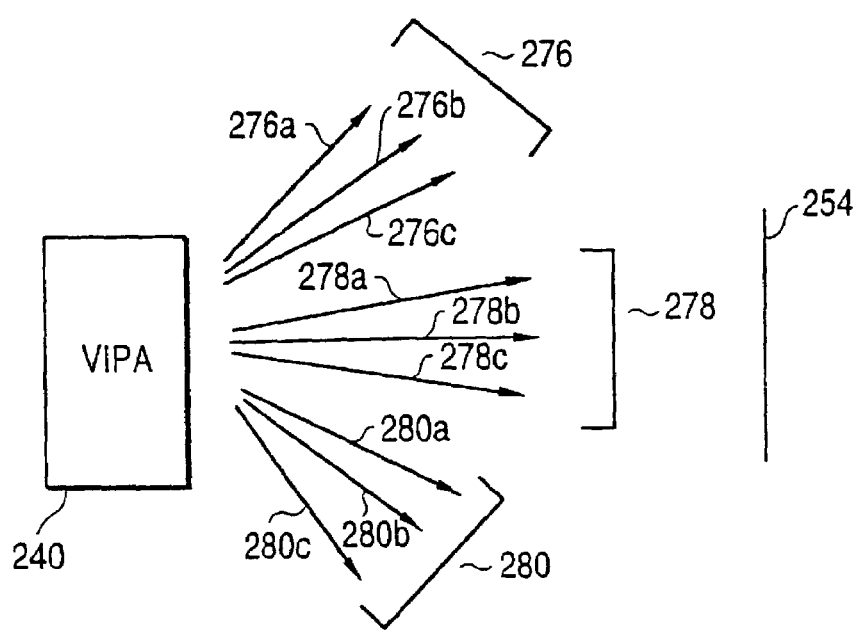
F I G. 16

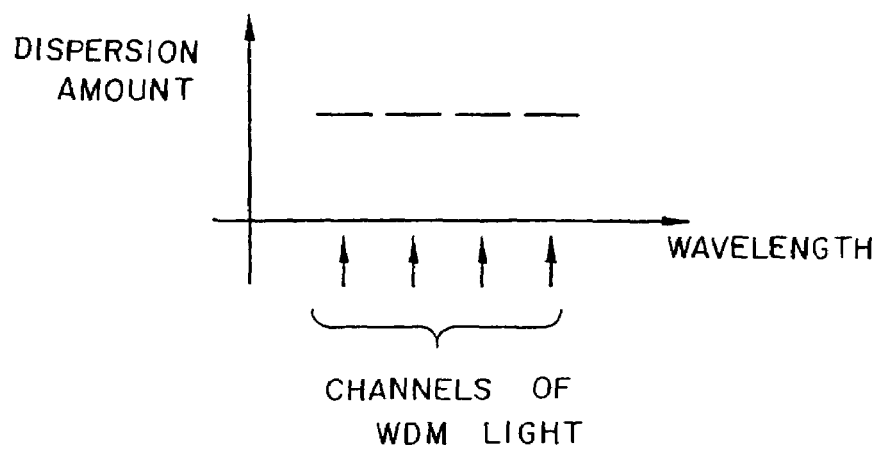
F I G. 17

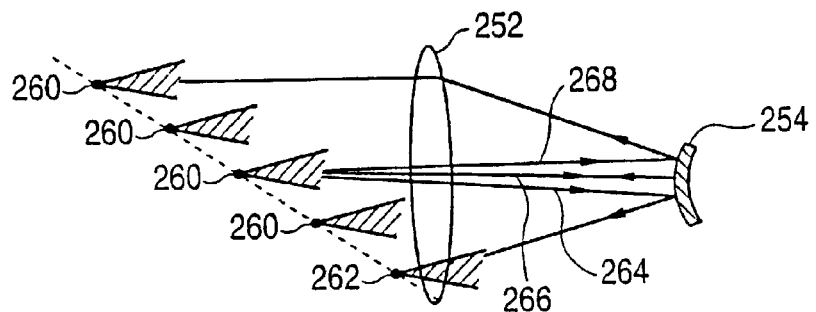
F I G. 18 A
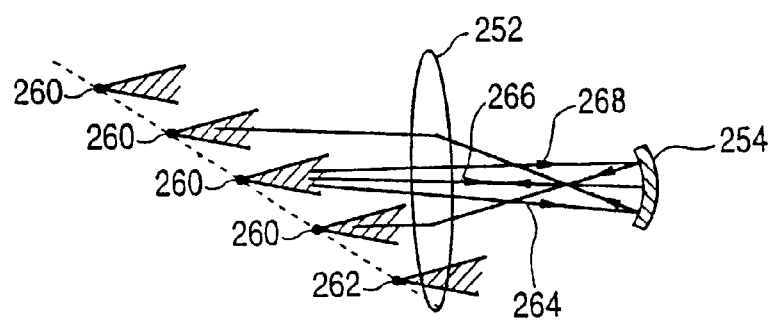
F I G. 18 B

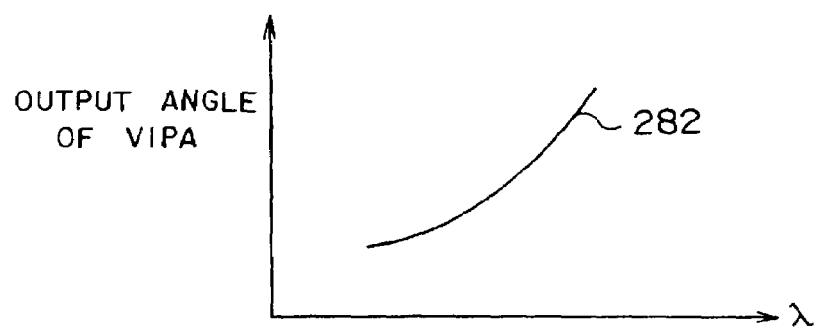
F I G. 19

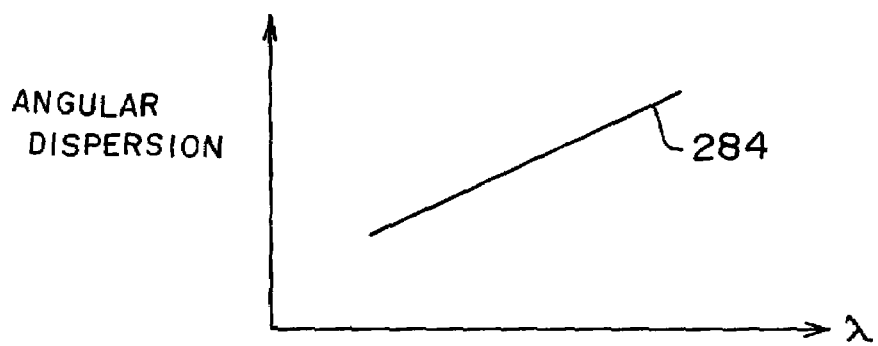
F I G. 20

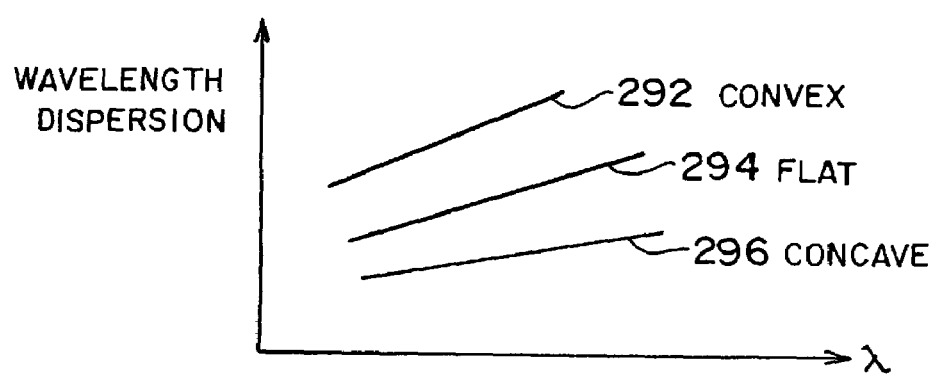
F I G. 22

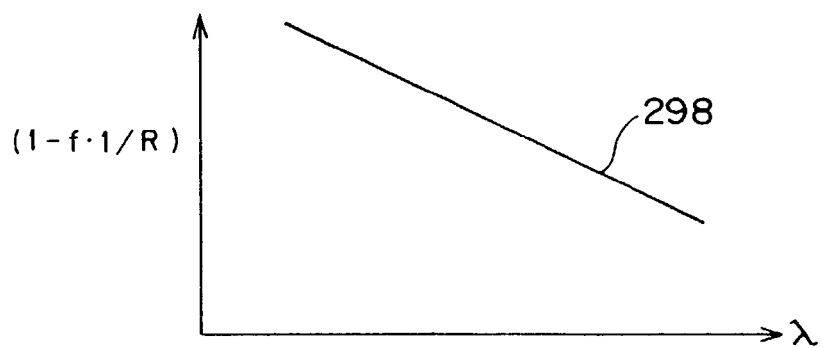
F I G. 23

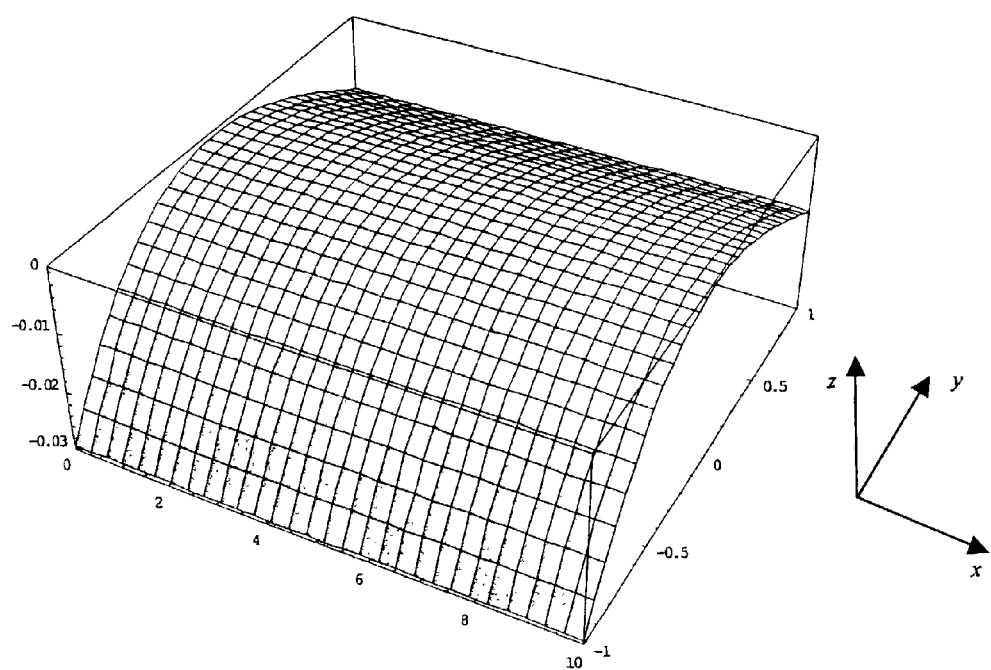
F I G. 26

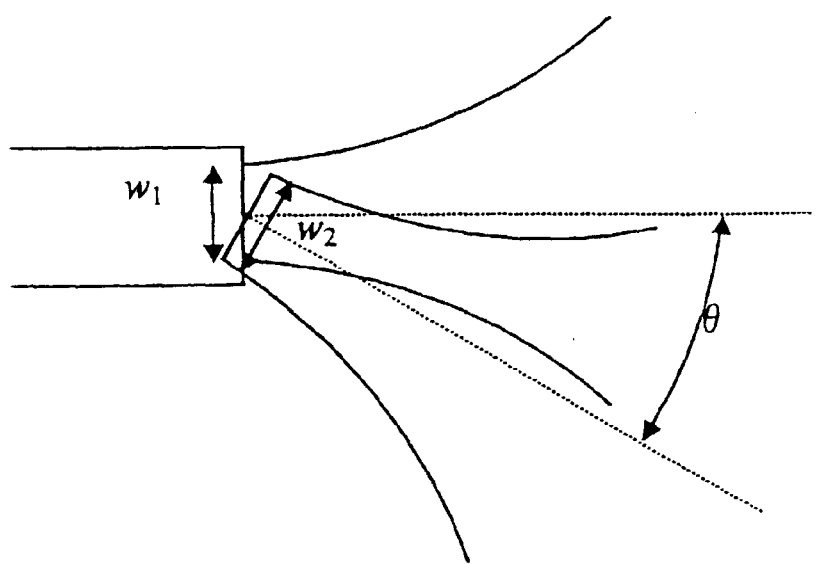
F I G. 29

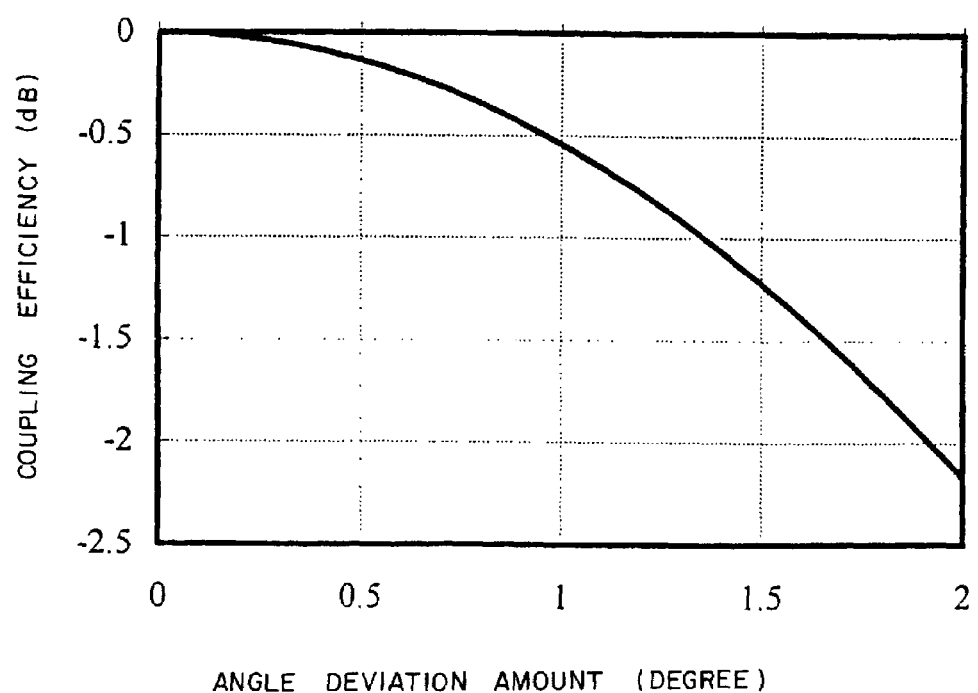
F I G. 30

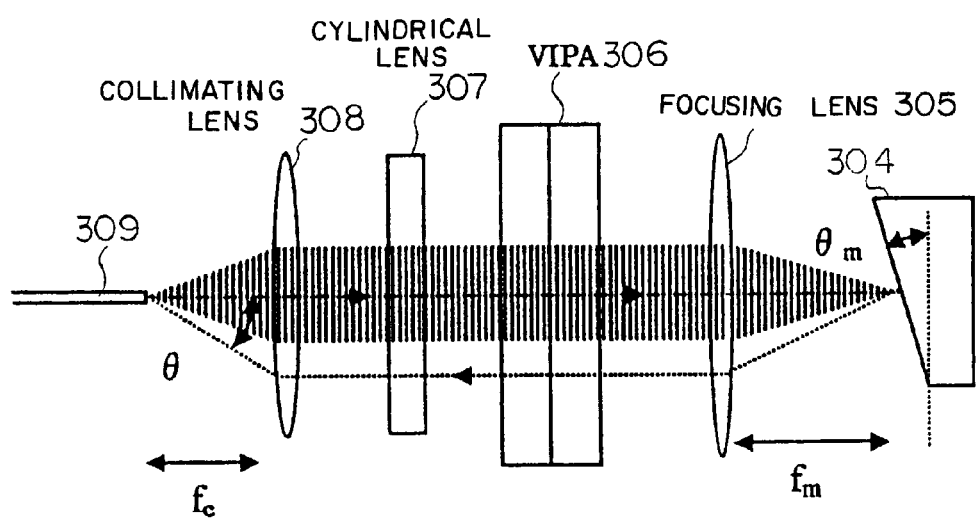
F I G. 31

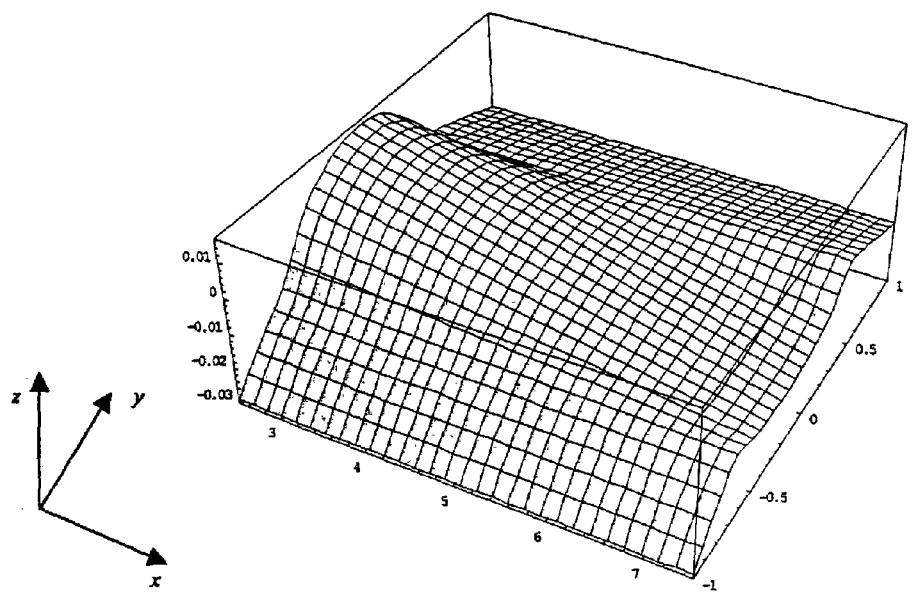
F I G. 32A
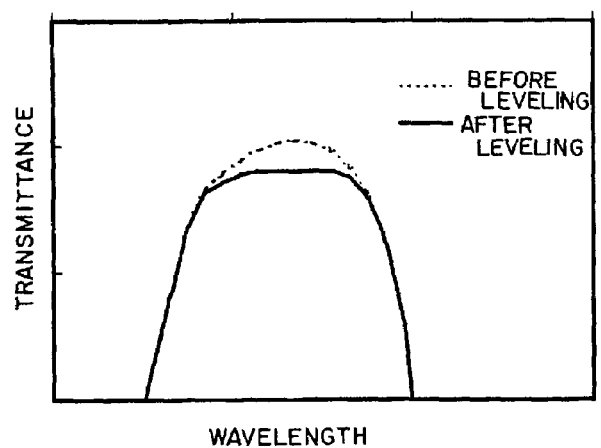
F I G. 32B

DEVICE USING A VIRTUALLY-IMAGED PHASED ARRAY (VIPA) WITH AN IMPROVED TRANSMISSION WAVE CHARACTERISTIC OF OUTPUT LIGHT

BACKGROUND OF THE INVENTION

1. Field of the Invention

The present invention relates to a device for generating wavelength dispersion and a device for compensating for wavelength dispersion accumulated in an optical fiber transmission line, and in particular, it relates to a device using a virtually-imaged phased array (VIPA) to generate wavelength dispersion.

2. Description of the Related Art

In a conventional fiber optic communication system for transmitting information using light, a transmitter sends a signal in the form of optical pulses to a receiver through an optical fiber. However, wavelength dispersion, which is also called "chromatic dispersion", degrades the quality of the signals in the system.

More specifically, as a result of wavelength dispersion, the propagation speed of signal light in an optical fiber varies depending on the wavelength of the signal light. For example, if an optical pulse with a long wavelength (for example, optical pulse with a wavelength representing a red color) propagates faster than an optical pulse with a short wavelength (for example, optical pulse with a wavelength representing a blue color), the dispersion is called "normal dispersion". Conversely, if an optical pulse with a short wavelength (for example blue pulse) propagates faster than an optical pulse with a long wavelength (for example, red pulse), the dispersion is called "abnormal dispersion".

Therefore, if a signal optical pulse transmitted from a transmitter includes a red pulse and a blue pulse, the signal optical pulse is divided and separated into the red pulse and the blue pulse while they propagate through an optical fiber, and each of the respective optical pulses arrives at a different time at the receiver.

For another example of a signal optical pulse transmission, if a signal optical pulse with different wavelength components continuously ranging from a blue color to a red color is transmitted, each element propagates through an optical fiber at different speed. Therefore, the time width of the signal optical pulse is broadened in the optical fiber and distortion occurs. Since each pulse has elements in a limited wavelength range, such wavelength dispersion is very common in an fiber optic communication system.

Therefore, in particular, in a high-speed fiber optic communication system, in order to obtain high transmission capacity, such wavelength dispersion must be compensated for.

In order to compensate for such wavelength dispersion in an fiber optic communication system, a "reciprocal dispersion component" reversing the wavelength dispersion generated in an optical fiber to a signal optical pulse is needed.

Some conventional devices can be used for such a "reciprocal dispersion component". For example, since a dispersion compensation fiber has a special sectional refractive index profile and applies a wavelength dispersion which is the reverse of wavelength dispersion generated in an ordinary transmission line fiber to a signal optical pulse, the fiber can be used as a "reciprocal dispersion component". However, the production of a dispersion compensation fiber is expensive and a fairly long fiber is needed to sufficiently compensate for the wavelength dispersion generated in the transmission line fiber. For example, in order to completely compensate for wavelength dispersion generated in a 100 km transmission line fiber, a dispersion compensation fiber 20 km to 30 km long is needed. Therefore, optical loss increases and also dimensions become large, which are problems.

FIG. 1 shows a chirped fiber grating with a "reciprocal dispersion component" function to compensate for wavelength dispersion.

As shown in FIG. 1, light that suffers from wavelength dispersion when propagating through an optical fiber is supplied to the input port 48 of an optical circulator 50.

The optical circulator 50 supplies the light to the chirped fiber grating 52. The chirped fiber grating 52 returns the light to the circulator 50 so that each different wavelength component of the light can propagate over a different distance and wavelength dispersion can be compensated for.

For example, the chirped fiber grating 52 can be designed so that a long-wavelength component of light can be reflected over a long distance by the chirped fiber grating 52 and can propagate over a distance longer than a short-wavelength component of the light. Then, the circulator 50 supplies light reflected off the chirped fiber grating 52 to an output port 54. In this way, the chirped fiber grating 52 can apply reciprocal dispersion to a signal optical pulse.

However, the chirped fiber grating 52 has only too narrow a band to reflect a signal optical pulse. Therefore, a wavelength band sufficient to compensate for light containing many wavelengths such as wavelength division multiplexed light cannot be obtained. However, many chirped fiber gratings can be connected in a cascade for such a wavelength division multiplexed signal. In this case, the system costs dearly. The combination of a chirped fiber grating and a circulator shown in FIG. 1 is suitable for a one-channel fiber optic communication system.

FIG. 2 shows a conventional diffraction grating generating wavelength dispersion. As shown in FIG. 2, a diffraction grating 56 has a grated plane 58. A parallel ray 60 with different wavelengths is input to the grating plane 58. Then, the ray is reflected off each step of the grating plane 58, and the plurality of reflected rays interfere with one another. As a result, rays 62, 64 and 66 each with a different wavelength, are output from the diffraction grating 58 at different angles. In order to compensate for the wavelength dispersion of a parallel ray using a diffraction grating, the diffraction grating can be used in a spatial grating pair array, which is described in detail below.

FIG. 3A shows a spatial grating pair array used as a reciprocal dispersion component in order to compensate for wavelength dispersion. As shown in FIG. 3A, a parallel ray 67 is diffracted by the first diffraction grating 68 and is separated into a ray with a short wavelength 69 and a ray with a long wavelength 70. Then, these rays 69 and 70 are diffracted by the second diffraction grating 71 and propagate in the same direction. As shown in FIG. 3A, each wavelength component with a different wavelength propagates over a different distance, reciprocal dispersion is applied and wavelength dispersion is compensated for. Since a long wavelength like the ray 70 propagates over a distance longer than a short wavelength like the ray 69, the spatial grating pair array shown in FIG. 3A has abnormal dispersion.

FIG. 3B shows another spatial grating pair array used as a reciprocal dispersion component in order to compensate for chromatic dispersion. As shown in FIG. 3B, lenses 72 and 74 are inserted between the first and second diffraction gratings 68 and 71 so that the lenses 72 and 74 share one focal point. Since a long wavelength like the ray 70 propagates over a distance shorter than a short wavelength like the ray 69, the spatial grating pair array shown in FIG. 3B has normal dispersion.

The spatial grating pair arrays shown in FIGS. 3A and 3B are generally used as laser resonators to control dispersion. However, an actual spatial grating pair array cannot apply dispersion sufficient to compensate for a fairly large amount of chromatic dispersion generated in an fiber optic communication system. More specifically, angular dispersion generated by a diffraction grating is usually very small and is generally approximately 0.05 degree/nm. Therefore, in order to compensate for wavelength dispersion generated in an fiber optic communication system, the first and second diffraction gratings 68 and 71 must be located far apart. Therefore, such a spatial grating pair array is not practical.

Against the conventional device, Japanese Patent Application Nos. 10-534450 and 513133 propose a device comprising a virtually-imaged phased array (VIPA 1) shown in FIG. 4.

The VIPA 1 generates light that propagates from the VIPA 1. This device comprises a light returning device returning light to the VIPA 1 and generating multiple reflection in the VIPA 1.

The device can also comprise a VIPA receiving input light with a wavelength in a continuous wavelength range and generating a corresponding output light. This output light can be spatially distinguishable from output light with another wavelength in the continuous wavelength range (for example, each of them travels in a different direction). If this output light can be distinguishable by a traveling angle, it can be said that this device has angular dispersion.

Furthermore, such a device can also comprise a VIPA 1 and a light returning device 2. The VIPA 1 further comprises a transmission area and a transparent material. Light can be input/output to/from the VIPA 1 through the transmission area. The transparent material 3 has the first and second planes. The second plane has reflectivity and transmits part of the input light. The input light is received by the VIPA 1 through the transmission area, is reflected many times between the first and second planes of the transparent material. Then, a plurality of light rays are transmitted through the second plane. The plurality of transmitted light rays interfere with one another and output light 4 is generated. The input light has a wavelength in a continuous wavelength range, and the output light 4 can be distinguishable from another output light with another wavelength in the continuous wavelength range. The light returning device 2 can return the output light 4 to the second plane in the completely opposite direction, and the output light 4 is input to the VIPA 1 through the second plane. Then, the output light 4 is multiply reflected in the VIPA 1 and is output to an input route through the transmission areas of the VIPA 1.

Furthermore, such a device can also comprise a VIPA 1 generating a plurality of pieces of output light 4 with the same wavelength as that of input light but each with a different order of interference. This device also comprises the light returning device 2 returning some pieces of output light with one order of interference to the VIPA 1 and not returning the other pieces of output light. In this way, only light with one order of interference can be returned the VIPA 1.

Furthermore, such a device can also comprise a VIPA 1, a light returning device 2 and a lens 5. The VIPA 1 receives input light and generates corresponding output light that propagates from the VIPA 1. The light returning device 2 receives the output light 4 from the VIPA 1 and returns the output light to the VIPA 1. In the lens 5, (a) the light 4 output from the VIPA 1 transmits through lens 5, and travels to the light returning device 2 since they are collected at the light returning device 2 by the lens 5; then (b) the output light 4 travels from the light returning device 2 to the lens 5 and are returned from the light returning device 2 to the VIPA 1 since the output light is directed to the VIPA 1 by the lens 5; and further (c) the output light 4 traveling from the VIPA 1 to the lens 5 is positioned in such a way that the output light can travel in parallel with and in the opposite direction of the output light returned from the lens 5 to the VIPA 1. Furthermore, output light traveling from the VIPA 1 to the lens 5 does not overlap output light returned from the lens 5 to the VIPA 1.

Furthermore, such a device can also comprise VIPAs 1, a mirror 6 and a lens 5. VIPA 1 receives input light and generates a corresponding output light that propagates from VIPA 1. The lens 5 collects output light rays 4 at the mirror 6, the mirror 6 reflects the output light rays and the reflected light rays are returned to the VIPA 1 by the lens 5. The mirror is shaped in such a way that the device can generate specific wavelength dispersion.

As described above, a VIPA has an angular dispersion function like a diffraction grating and can compensate for wavelength dispersion. In particular, the VIPA has large angular dispersion, and can easily provide a practical reciprocal dispersion component.

FIGS. 5 through 7 shows the characteristics of a device using a VIPA.

However, the transmittance characteristic by wavelength of a device using a VIPA to compensate for wavelength dispersion is not flat and is of round-top shape with a round peak around the center frequency of each transmission band, as shown in FIG. 5, which is another problem.

If there is a device with such a transmission characteristic in an optical transmission line, a signal optical pulse waveform transmitted from a transmitter is distorted and a signal cannot be accurately transmitted. In particular, if in a long-haul fiber optic communication system requiring the compensation of large wavelength dispersion, wavelength dispersion is compensated for by multi-connecting many devices using a VIPA, the undesirable transmission characteristics are overlapped and a signal optical pulse greatly degrades. In this case, it is preferable for a device using a VIPA to have a flat output light wavelength characteristic shown in FIG. 6.

Theoretically, such a non-flat transmission characteristic is generated in a device using a VIPA for the following reasons.

Firstly, the travel direction of output light from a VIPA varies depending on wavelength. In this case, light traveling in a direction in parallel with the axis of light input to the VIPA has the greatest strength and light traveling in a direction deviating from the axis of light input to the VIPA has less strength. This phenomenon can be explained as follows. Since light input to a VIPA usually consists of light rays converged by a lens, as shown in FIG. 4, the light contains a plurality of plane wave components each with a different travel direction. In this case, a plane wave component traveling in a direction in parallel with the axis of the input light has the greatest strength, and the greater the deviation from the axis of a plane wave component, the smaller is the strength of the plane wave component. However, a plurality of light rays multiply reflected in the VIPA interfere with one another and the wavelength of light, the strength of which is increased and output, varies for each plane wave component with a different travel direction. For this reason, it can be said that the strength of light output from a VIPA varies depending on wavelength.

This wavelength dependence of light output from a VIPA generates the wavelength dependence of transmittance in the transmission characteristic of a device using a VIPA. In other words, the transmission characteristic is not flat.

Secondly, since light with each wavelength output from a VIPA has a plurality of possible travel directions each with a different order of interference, the strength of the light is distributed among the plurality of pieces of light each with a different order of interference. In a device using a VIPA, light with an unnecessary order of interference must be discarded and light with a necessary order of interference must be extracted. Therefore, when light with an unnecessary order of interference to be discarded is output from the VIPA, there is optical loss corresponding to the unnecessary order of interference. However, whether light with each order of interference is output from the VIPA depends on the fact that the travel direction of the light with each order of interference is included in the travel directions of plane wave components of input light converged into the VIPA by a lens. Therefore, the number of times of the occurrence of light with an unnecessary order of interference varies depending on wavelength. The loss of light with a wavelength in which there is no light with an unnecessary order of interference is small, while the loss of light with a wavelength of light in which there are many unnecessary orders of interference is large. For this reason, the wavelength dependence of transmission wavelength characteristic is generated in a device using a VIPA. In other words, the transmission wavelength characteristic is not flat.

Thirdly, in order to compensate for wavelength dispersion by a device using a VIPA, an optical path length varying according to wavelength must be provided by returning light to a position varying according to wavelength when light output from the VIPA is reflected off a mirror and is returned to the VIPA. When light, the wavelength dispersion of which has been compensated for, is received and extracted as output light, the coupling efficiency of light to a fiber varies depending on wavelength due to the difference in a returning position in the VIPA depending on wavelength. Since usually an optical system is adjusted in such a way that light around the center wavelength of each transmission band can couple with a fiber most efficiently, the coupling efficiency of light with a wavelength away from the center wavelength is relatively low. For this reason, if wavelength dispersion is compensated for by a device using a VIPA, such a non-flat transmission characteristic can be obtained.

In Japanese Patent Application Nos. 10-534450 and 11-513133 described above, a detailed method for improving such a transmission characteristic and realizing such a preferable flat transmission characteristic in a device using a VIPA is not disclosed.

Using a conventional etalon filter, a characteristic the reverse of the wavelength characteristic of light output from a VIPA can be applied and the wavelength characteristic of the output light can be leveled to some degree. However, the transmission characteristic of a device using a VIPA sometimes has an asymmetrical shape with a peak wavelength as a center in which a wavelength width on a short wavelength side and a wavelength width on a long wavelength side are different in designing, as shown in FIG. 7, and it cannot be leveled in a strict sense. By multi-connecting etalon filters each with a different transmitted light cycle, an asymmetrical filter can be realized. However, the grater the number of filters, the greater the loss of transmitted light and the higher the cost of the system, which is not practical.

SUMMARY OF THE INVENTION

It is an object of the present invention to provide means for suppressing optical loss and improving the wavelength characteristic of output light in an economical way in a device using a VIPA in order to compensate for wavelength dispersion.

The device of the present invention comprises; a virtually-imaged phased array (VIPA) with a plurality of transmission areas receiving and outputting light, receiving input light with each wavelength in a continuous wavelength range across the transmission areas each, dispersing the input light with each wavelengths in the continuous wavelength range at a different angle for each wavelength by multiply reflecting the input light and making the multi-reflected light rays interfere with one another and generating output light spatially distinguishable from output light generated using input light with another wavelength in the continuous wavelength range; a lens collecting output light with an output angle varying according to wavelength at a position varying according to wavelength; a mirror in a shape designed to apply almost uniform wavelength dispersion to the light output from the VIPA regardless of an angular dispersion direction generated by the VIPA, reflecting and returning the collected light to the lens, which returns the reflected light to the VIPA, receiving the output light that is returned by the lens and then is reflected by the VIPA, multiply reflecting the output light in the VIPA and outputting the light from the VIPA through transmission areas; and means for generating a large optical path deviation in a direction perpendicular to the angular dispersion direction of the VIPA varying according to wavelength in the continuous wavelength range of the light returned to the VIPA by the mirror. The device can provide output light with a desired transmission wavelength characteristic by coupling the output light at an optical fiber at coupling efficiency varying according to wavelength.

According to the present invention, the transmission wavelength characteristic of a VIPA can be leveled easily and in an economical way, and an fiber optic communication system suppressing the degradation of optical signals passing through the transmission band of the VIPA and transmitting high-quality optical signals can be realized accordingly.

BRIEF DESCRIPTION OF THE DRAWINGS

The present invention will be more apparent from the following detailed description in conjunction with the accompanying drawings, in which:

FIG. 1 shows a chirped fiber grating with a "reciprocal dispersion component" function to compensate for wavelength dispersion;

FIG. 2 shows a conventional diffraction grating generating wavelength dispersion;

FIGS. 3A and 3B show a spatial grating pair array used as a reciprocal dispersion component in order to compensate for wavelength dispersion;

FIG. 6 shows a preferable flat transmission characteristic of the device using a VIPA;

FIG. 7 shows the asymmetrical transmission characteristic of the device using a VIPA;

FIG. 9 shows the VIPA in detail according to one preferred embodiment of the present invention shown in FIG. 8;

FIG. 14 shows the configuration of a device using a VIPA for an angular dispersion unit generating chromatic dispersion, according to one preferred embodiment of the present invention;

FIG. 16 shows a variety of orders of interference of a VIPA according to one preferred embodiment of the present invention;

FIG. 17 shows the respective chromatic dispersion of several channels of multi-wavelength light according to one preferred embodiment of the present invention;

FIGS. 18A and 18B are side views of a device using a VIPA in order to disperse light, according to another preferred embodiment of the present invention;

FIG. 19 shows the output angle of the optical flux of a VIPA against the wavelength of the optical flux;

FIG. 20 shows the angular dispersion of a VIPA against the wavelength of an optical flux according to one preferred embodiment of the present invention;

FIG. 22 shows chromatic dispersion against wavelength for each different type of mirror used, of a device using a VIPA according to one preferred embodiment of the present invention;

FIG. 23 shows the effect of the mirror of a device using a VIPA according to one preferred embodiment of the present invention;

FIG. 26 shows an example of the three-dimensional shape of a mirror for a device using a VIPA according to the preferred embodiment of the present invention;

FIG. 29 shows the relationship between an angular deviation amount and coupling efficiency;

FIG. 30 is a graph showing the relationship between an angular deviation amount and coupling efficiency;

FIG. 31 shows the relationship between mirror tilt and coupling efficiency;

FIGS. 32A and 32B show an example of a mirror shape generating large optical path deviation varying according to wavelength, used in the preferred embodiment of the present invention and the mirror effect thereof;

DESCRIPTION OF THE PREFERRED EMBODIMENTS

Embodiments of the present invention provide a device comprising a mirror in a shape so as to generate almost uniform wavelength dispersion in an angular dispersion direction generated by a VIPA regardless of each wavelength output by the VIPA and means for controlling the size of the optical path deviation of light returning to the VIPA after being reflected off the mirror for each wavelength in the device comprising the VIPA.

The preferred embodiments of the present invention are described in detail below with reference to the drawings. In the attached drawings, devices with the same function are denoted by the same reference numbers.

Figure 8:
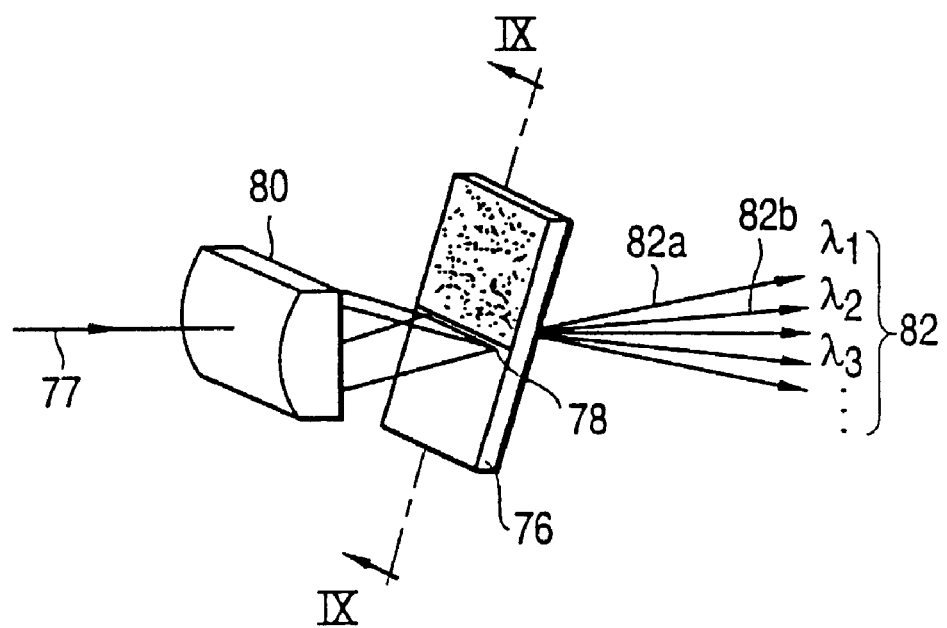
FIG. 8 shows a VIPA according to one preferred embodiment of the present invention.

FIG. 8 shows the configuration of a virtually-imaged phased array (VIPA) used in one preferred embodiment of the present invention. A "visually-imaged phased array" and a "VIPA" can be used interchangeably hereinafter.

According to FIG. 8, it is preferable to make a VIPA 76 from a thin glass plate. Input light 77 is collected into a line 78, using a lens 80, such as a semi-cylindrical lens, etc., and the light travels toward the VIPA 76. The line 78 is called a "focal line" 78 hereinafter. The input light 77 propagates in all directions from the focal line 78 and is received by the VIPA 76. Then, the VIPA 76 outputs the optical flux 82 of parallel rays. The output angle of the optical flux 82 varies depending on the wavelength of the input light 77. For example, if the wavelength of the input ray 77 is $\lambda 1$, the VIPA 76 outputs the optical flux 82a with wavelength $\lambda 1$ in a specific direction. If the wavelength of the input ray 77 is $\lambda 2$, the VIPA 76 outputs the optical flux 82b with wavelength $\lambda 2$ in another direction. Therefore, the VIPA 76 generates two pieces of optical flux 82a and 82b that can be spatially distinguishable from each other.

FIG. 9 shows the detailed VIPA 76 used in one preferred embodiment of the present invention. According to FIG. 9, the VIPA 76 comprises, for example, a glass plate 120 with reflector films 122 and 124 coated on the surfaces. It is preferable for the reflectance of the reflective film 122 to be between 95% and 100%. It is preferable for the reflectance of the reflective film 124 to be approximately 100%. A radiation window 126 is formed on the plate 120, and it is preferable for the reflectance to be approximately 0%. The input light 77 is collected at the focal line 78 through the radiation window 126 by the lens 80, and is multiply reflected off the reflector planes 122 and 124. It is preferable for the focal line 78 to be on the plate 120 with the reflective film 122. As described above, the focal line 78 essentially collects light rays at the reflective film 122 through the radiation window 126. The width of the focal line, on which light is collected, is also called the beam waist of the input light 77. As described above, in the preferred embodiment of the present invention shown in FIG. 9, the beam waist of the input light 77 is collected at the distant plane of the plate 120 (that is, the reflector plane 122). In the preferred embodiment, it is preferable to reduce the possibility of the area of the radiation window 126 (for example, the area a shown in FIG. 12, which is described in detail below) and an area on the reflector plane 124, through which the input light 77 firstly reflected off the reflective film 124 (for example, the area b shown in FIG. 12, which is described in detail below) overlapping, by collecting the beam waist at the distant plane (reflective film 122).

In FIG. 9, the optical axis 132 of the input light 77 has a slight tilt angle θ. In the first reflection of the reflective film 122, 5% of the light transmits through the reflector film 122 and diverges after passing through the beam waist. However, 95% of the light is reflected toward the reflective film 124. After firstly reflected off the reflective film 124, the light hits the reflective film 122 again deviated by d this time. Then, 5% of the light transmits through the reflective film 122. As shown in FIG. 9, similarly, the light branches into many routes at specific intervals d. The light of each route takes a shape such that it diverges from the virtual image 134 of the beam waist. The virtual image 134 arrayed at specific intervals 2t along the line perpendicular to the plate 120. In this case, t is the thickness of the plate 120. The position of the beam waist in the virtual image 134 is automatically determined and there is no need to adjust each position. Light rays from the virtual image 134 interfere with one another and form plane waves 136 each of which propagates in a direction varying depending on the wavelength of the input ray 77.

The interval between optical paths is d=2t Sin θ, and the difference in route length between adjacent light rays is 2t Cos θ. Angular dispersion is directly proportional to the ratio of these two values. In other words, it is cot θ. As a result, the VIPA generates fairly large angular dispersion.

As clear from FIG. 9, a terminology "virtually-imaged phased array" derives from the formation of the array of virtual images 134.

Figure 10:
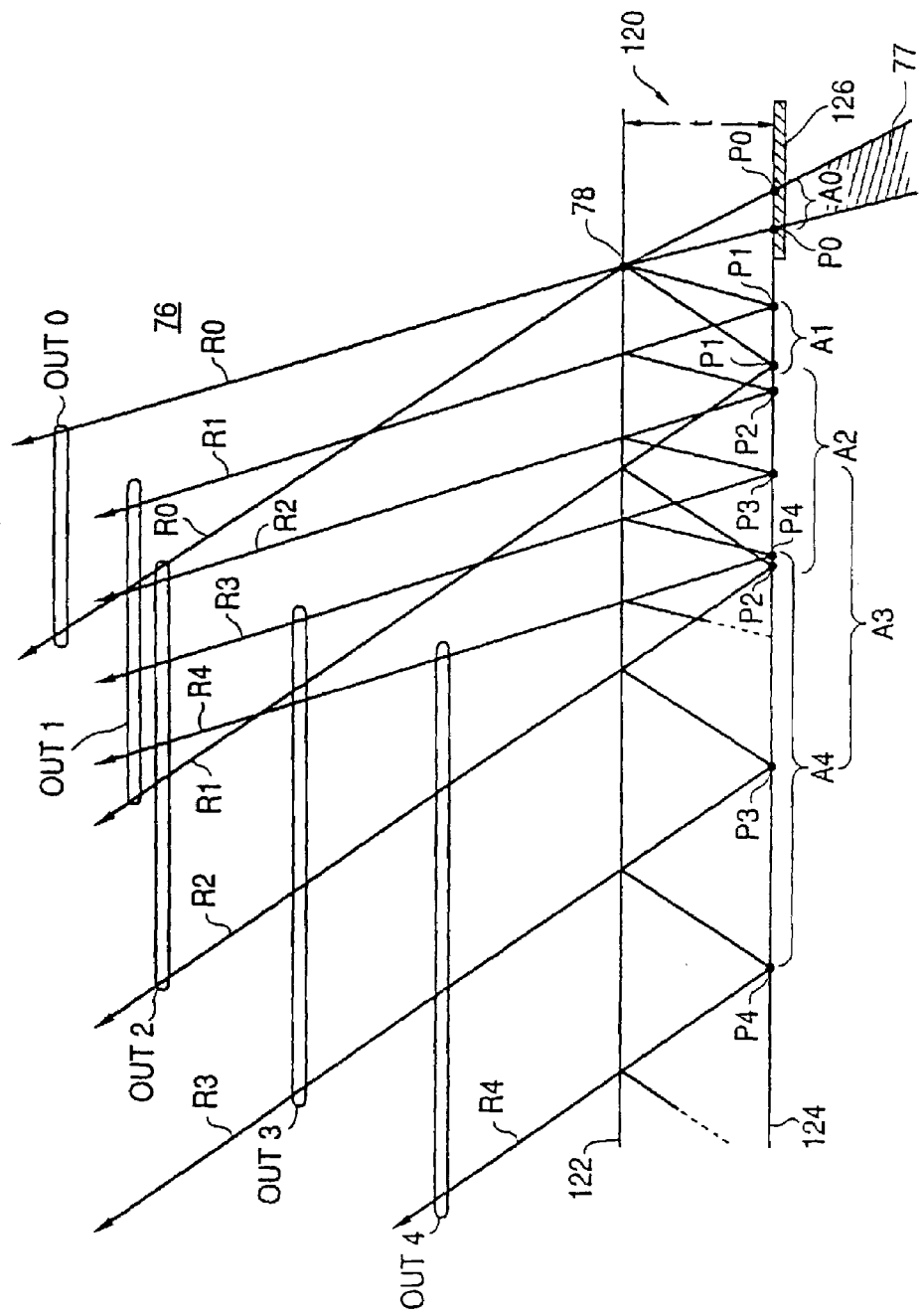
FIG. 10 is a cross section view cut along the straight line IX—IX of a VIPA according to one preferred embodiment of the present invention shown in FIG. 8.

FIG. 10 is the cross section view along a straight line IX—IX of the VIPA 76 according to the preferred embodiment of the present invention shown in FIG. 8. According to FIG. 10, the plate 120 has two reflective films 122 and 124. The reflective films 122 and 124 are placed at intervals t, which is the thickness of the plate 120. As described above, the reflectance of the reflective film 124 is approximately 100% except that of the radiation window 126. The reflectance of the reflective film 122 is 95% or more. Therefore, since the transmittance of the reflective film 122 is 5% or less, 5% or less of the input light transmits through the reflective film 122 and 95% or more of the light is reflected. Each of the respective reflectance of the reflective films 122 and 124 can be easily modified in specific applications of a VIPA. However, generally, the reflectance of the reflective film 122 must be less than 100% so that part of the input light can be transmitted.

The reflective film 124 is provided with the radiation window 126. It is preferable for the radiation window 126 to transmit all light rays and to reflect no light rays or for the reflectance thereof to be very small. The radiation window 126 receives input ray 77 on the reflective films 122 and 124 and reflects the light 77.

FIG. 10 is the cross section view along the straight line IX—IX shown in FIG. 8. The focal line 78 shown in FIG. 8 is expressed as a "point" in FIG. 10. In this case/the input light 77 propagates in all directions from the focal line 78. Furthermore, as shown in FIG. 10, the focal line 78 is located on the reflective film 122. Although the focal line 78 need not necessarily be located on the reflective film 122, in that case, the characteristic of the VIPA 76 slightly changes due to the positional deviation of the focal line 78.

As shown in FIG. 10, the light 77 is input to the plate 120 through the radiation window 126. In FIG. 10, a point P0 represents a point around an area A0.

95% or more of the input light 77 is reflected off the reflective film 122 according to the reflectance thereof and is input to the area A1 of the reflective film 124. A point P1 represents a point around the area A1. After being reflected off the area A1 of the reflective film 124, the input light 77 travels to the reflective film 122 again and part transmits through the reflective film 122 and becomes output light Out1 defined by a ray R1.

In this way, as shown in FIG. 10, the input light 77 is multiply reflected off the reflective films 122 and 124. In this case, every time the light 77 is reflected off the reflective film 122, transmitted light is generated. Therefore, for example, immediately after being reflected off the areas A2, A3 and A4 of the reflective film 124, the input light 77 is reflected off the reflective film 122, and a plurality of pieces of output light Out2, Out3 and Out4 are generated. A point P4 represents a point around the area A4. The output light Out4 is defined by a ray R4. Although FIG. 10 shows only Out1, Out2, Out3 and Out4, in reality, there are more pieces of output light depending on the strength of the input light 77 and the respective reflectance of the reflective films 122 and 124. Although the details are described below, a plurality of output light rays interfere with one another and result in optical flux consisting of light rays with a direction varying depending on the wavelength of the input light 77 each. Therefore, the optical flux can be described as output light generated by the interference between a plurality of pieces of output light Out1, Out2, Out3 and Out4.

Figure 11:
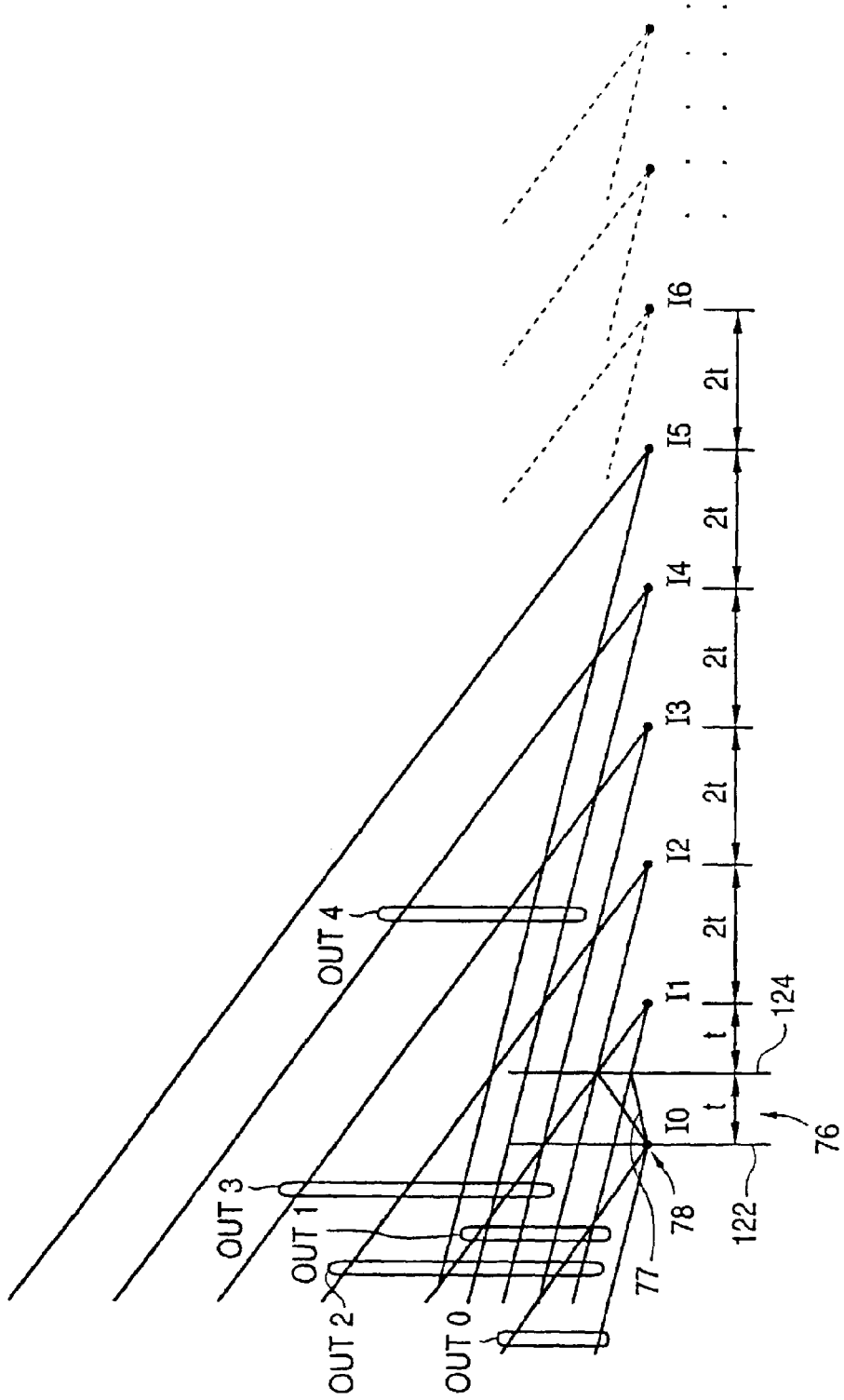
FIG. 11 shows interference between light rays reflected by a VIPA according to one preferred embodiment of the present invention.

FIG. 11 shows the interference between a plurality of reflected light rays generated by a VIPA according to the preferred embodiment of the present invention. According to FIG. 12, light traveling from the focal line 78 is reflected off the reflective film 124. As described above, the reflectance of the reflective film 124 is approximately 100% and has essentially a mirror function. As a result, it can be optically analyzed that output light Out1 is emitted from a focal line I1. Similarly, it can be also analyzed that a plurality of pieces of output light Out2, Out3 and Out4 are emitted from focal lines I2, I3 and I4, respectively. Each of the focal lines I2, I3 and I4 is the virtual image of the focal line I0.

Therefore, as shown in FIG. 11, the focal line I1 is located at a distance 2t from the focal line I0. It represents the distance between the reflective films 122 and 124. Similarly, each subsequent focal line is located at a distance 2t from the immediately previous focal line. Therefore, the focal line I2 is located at a distance 2t from the focal line I1. Furthermore, since current output light is multiply reflected off the reflective films 122 and 124 subsequently, the current output light weaker than the immediately previous output light. Therefore, the output light Out2 is weaker than the output light Out1.

As shown in FIG. 11, a plurality of output light rays from focal lines overlap and interfere with one another. More specifically, since each of the focal lines I1, I2, I3 and I4 is the virtual image of the focal line I0, the plurality of pieces of output light Out1, Out2, Out3 and Out4 have the same optical phase at the focal points I1, I2, I3 and I4, respectively. Therefore, a plurality of pieces of optical flux each traveling in a different direction depending on the wavelength of the input light 77 are generated.

A VIPA used in the preferred embodiment includes a constructive condition, which is a design characteristic of a VIPA. By this constructive condition, the interference between the plurality of pieces of output light increases and optical flux is formed. The constructive condition of a VIPA is expressed as follows.

$$2t \times \cos \phi = m\lambda \qquad (1)$$

where $\phi$: A propagation direction viewed from a line perpendicular to the reflective films 122 and 124, of formed optical flux, $\lambda$: The wavelength of input light, t: The distance between the reflective films 122 and 124, and m: An integer.

Therefore, if t is constant and m is a specific value, the propagation direction $\phi$ of optical flux formed against the input light with wavelength $\lambda$ can be determined.

Furthermore, the input light 77 spreads in all directions at specific angles from the focal line 78. Therefore, a plurality of pieces of input light with the same wavelength travel in many different directions from the focal line 78 and are reflected off the reflective films 122 and 124. By the constructive condition of a VIPA, light traveling in a specific direction is reinforced by interference between a plurality of pieces of output light, and optical flux with a direction corresponding to the wavelength of the input light is formed. Light traveling in a direction different from the specific direction based on the constructive condition is weakened by the interference between a plurality of pieces of output light.

Figure 12:
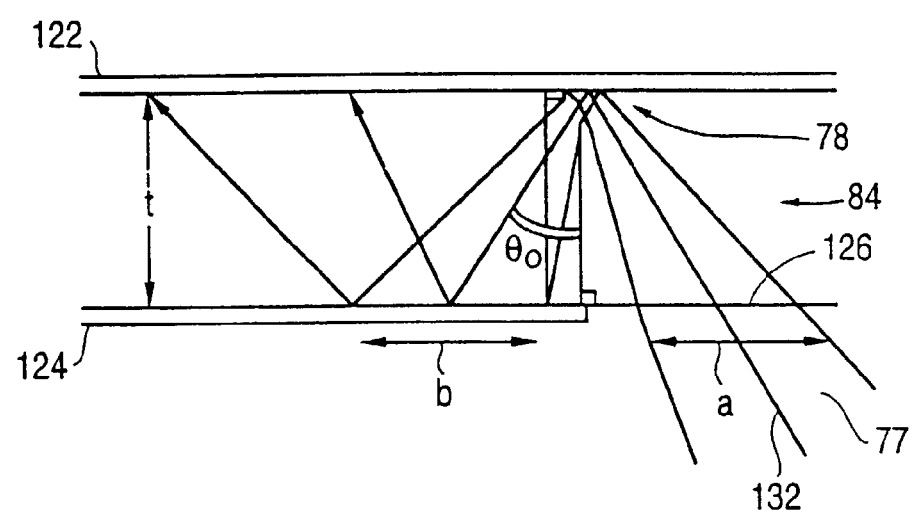
FIG. 12 is a cross section view cut along the straight line IX—IX of a VIPA determining the tilt angle of input light, according to one preferred embodiment of the present invention.

FIG. 12 is the cross section view along a straight line IX—IX of the VIPA according to one preferred embodiment of the present invention, and shows the characteristic of a VIPA determining the input angle or tilt angle of input light used in one preferred embodiment of the present invention.

According to FIG. 12, the input light 77 is collected at the focal line 78 by a cylindrical lens, which is not shown in FIG. 12. As shown in FIG. 12, the input light 77 covers an area with width equivalent to "a", of the radiation window 126. After being reflected off the reflective film 122 once, the input light 77 is input to the reflective film 124 and covers an area with width equivalent to "b", of the reflective film 124. Furthermore, as shown in FIG. 12, the input light 77 travels along an optical axis 132 with a tilt angle $\theta 0$ against a line perpendicular to the reflective film 122.

The tilt angle $\theta 0$ must be set to a value such that the input light 77 can be located within the plate through the radiation window 126 after being reflected off the reflective film 122 once. Specifically, the tilt angle $\theta 0$ such that the input light 77 can be caught in between the reflective films 122 and 124 and can be located within the plate through the radiation window 126, must be set as follows.

$$\text{Tilt angle of optical axis} \geq (a+b)/4t \qquad (2)$$

Therefore, as shown in FIGS. 8 through 12, the preferred embodiment of the present invention comprises a VIPA receiving input light with each wavelength in a continuous wavelength range. In the VIPA, input light 77 is multiply reflected and self-interference is induced. As a result, output light is generated. The output light can be spatially distinguishable from another piece of input light with another wavelength in the continuous wavelength range. For example, FIG. 10 shows input light 77 multiple reflected between the reflective films 122 and 124. A plurality of pieces of the input light 77 are multiply reflected and interfere with one another. As a result, a plurality of pieces of output light Out0, Out1, Out2, Out3 and Out4. The plurality of pieces of output light Out0, Out1, Out2, Out3 and Out4 constitute optical flux that can be spatially distinguishable from another piece of input light 77 with another wavelength in the continuous wavelength range can be generated.

Self-interference means interference caused between a plurality of pieces of light or a plurality of rays generated by the same light source. Since a plurality of pieces of output light Out0, Out1, Out2, Out3 and Out4 are all generated from the same light source (that is, input light 77), interference between the plurality of pieces of output light Out0, Out1, Out2, Out3 and Out4 is called the self-interference of the input light 77.

In the preferred embodiment of the present invention, input light 77 can have an arbitrary wavelength in a continuous wavelength range. Input light 77 is not limited to input light with a wavelength selected from discrete wavelengths. According to the preferred embodiment of the present invention, furthermore, output light generated based on input light with a specific wavelength in a continuous wavelength range can be spatially distinguishable from output light generated based on input light with another wavelength in the continuous wavelength range.

Therefore, for example, as shown in FIG. 8, the travel direction of optical flux 82 (that is, a spatial characteristic) varies depending on the wavelength in a continuous wavelength range of input light 77.

FIGS. 13A, 13B, 13C and 13D show how to produce a VIPA used in the preferred embodiment of the present invention.

Figure 13A:
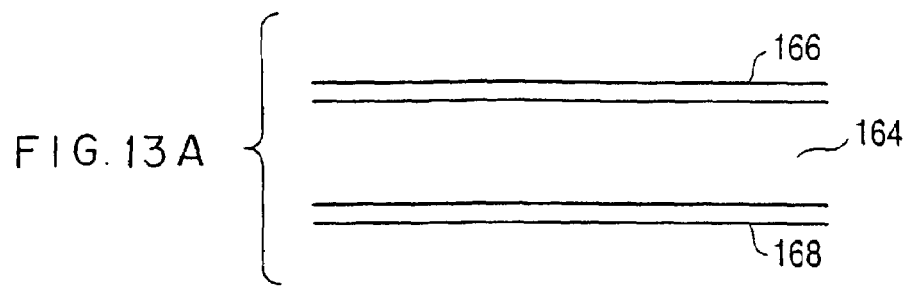
FIGS. 13A, 13B, 13C and 13D shows how to produce a VIPA according to one preferred embodiment of the present invention.

According to FIG. 13A, it is preferable for a parallel plate 164 to be made from glass, and the plate has parallel surfaces. Reflective films 166 and 168 are coated on each surface of the parallel plate 164 by vacuum deposition, ion beam-assisted deposition, sputtering and the like. It is preferable for the reflectance of one of the reflective films 166 and 168 to be 100% and the other to be between 80% and 100%.

Figure 13B:
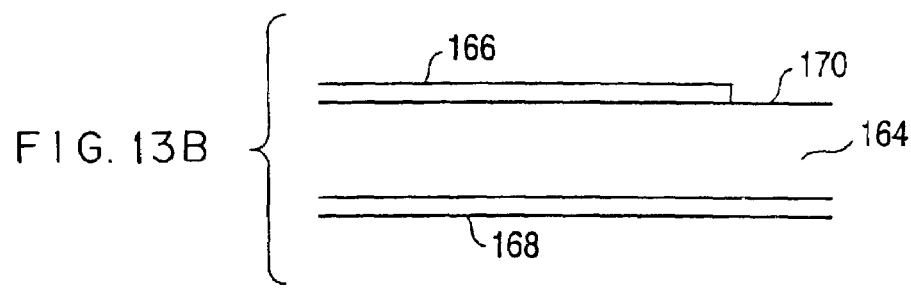

According to FIG. 13B, a radiation window is formed on one of the reflective films 166 and 168 by removing a part of the film. In FIG. 13B, a part of the reflective film is removed and the radiation window 170 is formed on the same surface as the reflective film of the parallel plate 164. A radiation window 170 can also be formed on the same surface as the reflective film 168 of the parallel plate instead of the reflective film 166. As shown in a variety of preferred embodiments of the present invention, the radiation window 170 can be formed on either surface of the parallel plate 164.

Although a reflective film can be removed by etching, the film can also be mechanically removed with less cost. However, if a reflective film is mechanically removed, the parallel plate 164 must be carefully handled so that damage to the parallel plate can be minimized. For example, if damage to the part of the parallel plate constituting the radiation window 170 is great, the parallel plate suffers too much damage from the dispersion of received input light.

Instead of forming a reflective film and removing part of the film, a radiation window can be formed by masking part of the parallel plate 164 corresponding to the radiation window in advance and preventing that part from being covered by the reflective film.

Figure 13C:
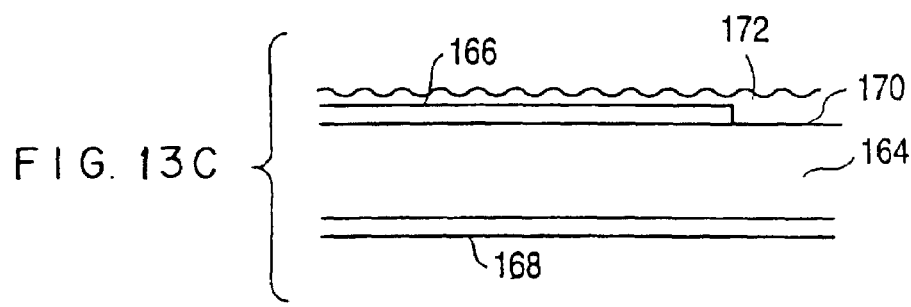

According to FIG. 13C, transparent adhesive agent 172 is painted on the reflective film 166 and part of the parallel plate, from which the reflective film 166 has been removed. Since the transparent adhesive agent 172 is painted on the part constituting the radiation window of the parallel plate 164, optical loss is minimized.

Figure 13D:
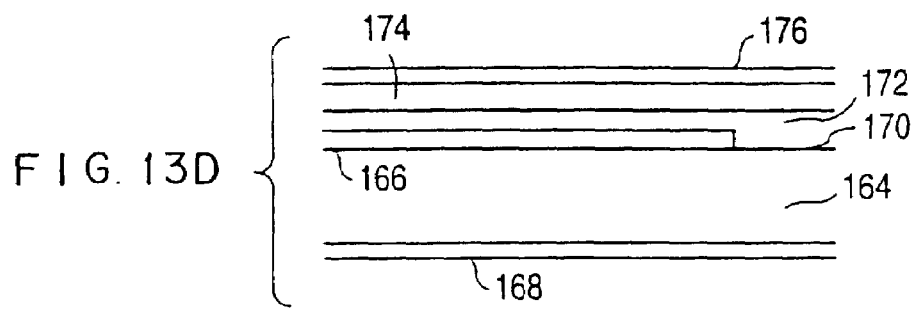

According to FIG. 13D, a transparent protector plate 174 is placed on the reflective film 166, on which the transparent adhesive agent 172 has been painted, and the reflective film 166 and parallel plate 164 are protected.

Since the transparent adhesive agent 172 is painted so as to fill up a concave part, from which the reflective film 166 has been removed, the transparent protector plate 174 is provided in parallel with the top surface of the parallel plate 164.

Similarly, in order to protect the reflective film 168, adhesive agent 172, which is not shown in FIG. 13D, must be painted on the top surface of the reflective film 168 and a protector plate 174, which is also not shown in FIG. 13D, must be provided. If the reflectance of the reflective film 168 is approximately 100% and there is no radiation window on the same surface of the parallel plate 164, there is no need for the adhesive agent and protector plate to be transparent.

Furthermore, an anti-reflection film 176 can be coated on the transparent protector plate 174. For example, the transparent protector plate 174 and radiation window 170 can be coated with an anti-reflection film 176.

Although in the preferred embodiment of the present invention described above, a focal line shall be located at a radiation window or on the surface opposite to that to which input light is input, of a parallel plate, however, a focal line can be located in a parallel plate or in front of a radiation window.

In the preferred embodiment of the present invention described above, light located between two reflective films is reflected, and the reflectance of one of the reflective films is approximately 100%. However, in this case, the same effect can also be obtained by two reflective films with reflectance of less than 100% each. For example, the reflectance of each of two reflective films can be 95%. In this case, each reflective film transmits light and interference is caused. As a result, optical flux traveling in a different direction depending on wavelength is formed on each surface of a parallel plate with reflective films. In this way, a variety of reflectance in a variety of preferred embodiment of the present invention can be modified according to the required characteristic of a VIPA.

Although a waveguide device used in the preferred embodiment of the present invention described above is formed by a parallel plate or two reflective films in parallel with each other, such a plate or reflective films do not have to be parallel.

A VIPA used in the preferred embodiment of the present invention described above maintains a specific phase difference between two pieces of interference light using multiple reflection. As a result, the characteristic of a VIPA can be stabilized and the change of an optical characteristic generated by the polarization thereof can be reduced.

According to the preferred embodiment of the present invention described above, a plurality of pieces of spatially distinguishable optical flux can be generated. A phrase "spatially distinguishable" means that a plurality of pieces of optical flux can be spatially distinguishable from one another. For example, if each of a variety of pieces of optical flux is collimated and travels in different direction or is collected at a different position, it can be said that the variety of pieces of optical flux can be spatially distinguishable. However, the present invention is not limited to such specified examples, and there are many other methods for spatially distinguishing a variety of pieces of optical flux from one another.

FIG. 14 shows a conventional device using a VIPA as an angular dispersion unit instead of a diffraction grating to generate wavelength dispersion. According to FIG. 14, a VIPA 240 comprises, for example, the first surface 242 with reflectance of approximately 100% and the second surface with reflectance of approximately 98%. The VIPA 240 also comprises a radiation window 247. The configuration of a VIPA 240 is not limited to this, and the variety of configurations described in this specification are possible.

As shown in FIG. 13, light is output from a fiber 246, is collimated by a collimating lens 248, is collected at the VIPA 240 in a shape of line through the radiation window 247 by a cylindrical lens 250. Then, the VIPA 240 generates collimated light 251, which is collected at a mirror 254 by a focusing lens 252. The mirror 254 can also be a mirror portion formed on a substrate 258.

The mirror 254 reflects light and transmits the light to the VIPA 240 through the focusing lens 252. Then, the light is multiply reflected within the VIPA 240 and is output from the radiation window 247. The light output from the radiation window 247 is received by a fiber 246 through the cylindrical lens 250 and collimating lens 248.

Therefore, light is output from the VIPA 240, is reflected off the mirror 254 and is returned to the VIPA 240. The light reflected off the mirror 254 travels in a direction opposite to the coming direction. As described in detail below, each different wavelength component of light is focused on a different point of the mirror 254, is reflected and is returned to the VIPA 240. As a result, each different wavelength component travels over a different distance, and wavelength dispersion is generated accordingly.

Figure 15:
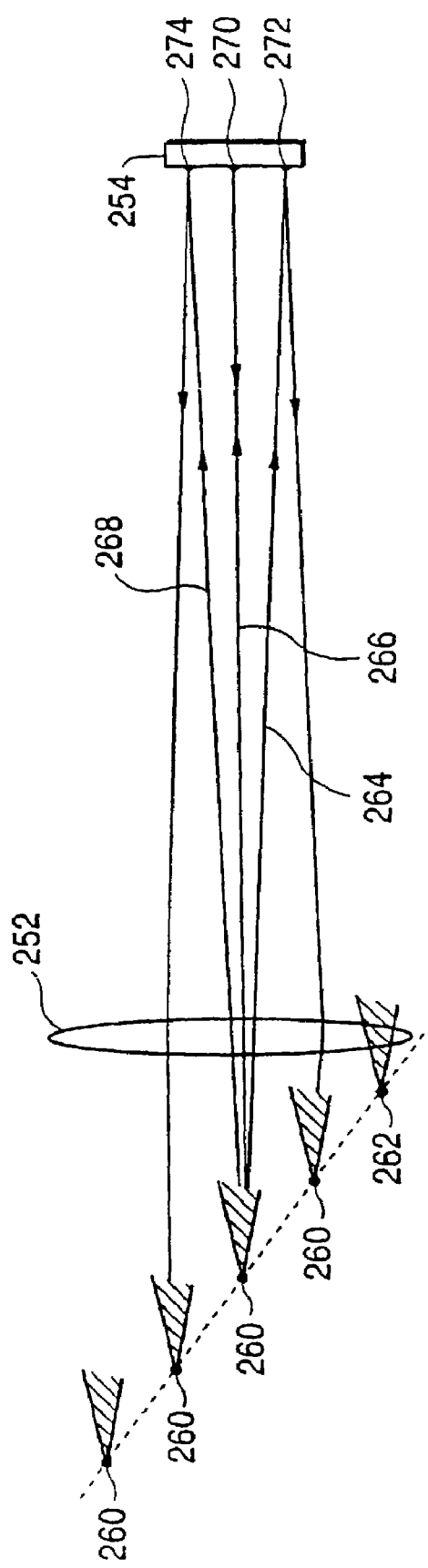
FIG. 15 shows the detailed operation of the device according to one preferred embodiment of the present invention shown in FIG. 14.

FIG. 15 shows the operation principle of the VIPA shown in FIG. 14 in more detail. It is assumed that the VIPA 240 receives light with a variety of wavelength components. As shown in FIG. 14, the VIPA 240 forms the virtual image 260 of a beam waist 262, and the virtual image 260 emits light. As shown in FIG. 14, the focusing lens 252 focuses a different wavelength component of collimated light from VIPA at a different point on the mirror 254. Specifically, a long wavelength 264, a center wavelength 266 and a short wavelength 268 are collected at points 272, 270 and 274, respectively. In this case, the long wavelength 264 is returned to a virtual image 260 nearer the beam waist 262 than the center wavelength 266. The short wavelength returns to a virtual image 260 farther away from the beam waist 262 than the center wavelength 266. Such an array generates normal dispersion.

The mirror 254 reflects only light with a specific order of interference, and a plurality of pieces of light with the other orders of interference are collected outside the mirror 254. Furthermore, as described above, the VIPA 240 outputs collimated light. Each piece of collimated light travels in a direction deviated by mX from each virtual image 260. In this case, m represents an integer. Light with the m-th order of interference is defined as output light corresponding to m.

For example, FIG. 16 shows a variety of interference orders of a VIPA. According to FIG. 16, the VIPA 240 emits a plurality of pieces of collimated light 276, 278 and 280. Each of the plurality of pieces of collimated light 276, 278 and 280 corresponds to a different order of interference. Therefore, for example, the plurality of pieces of collimated light 276, 278 and 280 correspond to the (n+2)th order of interference, the (n+1)th order of interference and the n-th order of interference, respectively. In this case, n represents an integer. It is assumed that the collimated light 276 has a plurality of wavelength components 276a, 276b and 276c. Similarly, it is assumed that the collimated light 278 has wavelength components 278a, 278b and 278c and that the collimated light 280 has wavelength components 280a, 280b and 280c. In this case, the wavelength components 276a, 278a and 280a have the same wavelength. The wavelength components 276b, 278b and 280b have the same wavelength (but different from the wavelength of the wavelength components 276a, 278a and 280a). The wavelength components 276c, 278c and 280c have the same wavelength (but different from the wavelength of the wavelength components 276a, 278a and 280a and also different from the wavelength of the wavelength components 276b, 278b and 280b). Although in FIG. 16, three pieces of collimated light with only three different orders of interference each are shown, collimated light is also emitted for other orders of interference.

Since collimated light with the same wavelength travels in a different direction for a different order of interference and is collected at a different position, the mirror 254 can reflect only light from a single order of interference and can return it to the VIPA 240. For example, as shown in FIG. 16, the length of the reflective portion of the mirror 254 is fairly small and it reflects only light corresponding to a single order of interference. Furthermore, in FIG. 16, only collimated light 278 is reflected off the mirror 254. In this way, two pieces of collimated light 276 and 280 are collected outside the mirror 254.

Multi-wavelength light usually contains many channels. If in FIG. 14, the thickness t between the first surface 242 and second surface 244 of the VIPA 240 is set to a specific value. In the configuration, the dispersion of each channel is simultaneously compensated for.

More specifically, each channel has a center wavelength. The center wavelengths are usually separated from one another at specific frequency intervals. The thickness t between the first surface 242 and second surface 244 of the VIPA 240 is set in such a way that all wavelength components corresponding to the center wavelengths can be output from the VIPA at the same angle, and they have to be focused on the same position of the mirror 254. This condition can be met if the thickness t is set to each channel in such a way that the round-trip travel distance of light in the VIPA 240 covered by a wavelength component corresponding a center wavelength can be a multiple of the center wavelength for each channel. This thickness t is called the "thickness of WDM-matching free spectrum range" or the "thickness of the FSR of WDM matching" hereinafter.

Furthermore, in this case, the round-trip travel distance of light through the VIPA ($2nt \cos \theta$) is equal to a wavelength obtained by multiplying the center wavelength of each channel with the same $\theta$ for a different integer by the integer, where n represents the refractive index of a material inserted between the first surface 242 and second surface 244 and $\theta$ represent the propagating direction of optical flux corresponding to the center wavelength of each channel. Furthermore, as described above, $\theta$ also represents the tilt angle of the optical axis of input light (see FIG. 9).

Therefore, if t is set in such a way that $2nt \cos \theta$ is equal to the integral multiple of the central wavelength of each channel with the same $\theta$ for a different integer, all wavelength components corresponding to each center wavelength have the same output angle against the VIPA 240 and are focused on the same point on the mirror 254.

For example, if a physical round-trip distance and a refractive index are 2 mm (approximately twice the thickness of 1 mm of the VIPA 240) and 1.5, respectively, all wavelengths at intervals of 100 GHz meet this condition. As the result, the VIPA 240 can simultaneously compensate for dispersion in all channels of multi-wavelength light.

Therefore, according to FIG. 15, if the thickness t is set to the thickness of the FSR of WDM matching, the VIPA 240 and focusing lens 252 can perform the following operations.

(a) A wavelength component corresponding to the center wavelength of each channel can be collected at the point 270 of the mirror 254.

(b) A wavelength component corresponding to the long wavelength of each channel can be collected at the point 272 of the mirror 254.

(c) A wavelength component corresponding to the short wavelength of each channel can be collected at the point 274 of the mirror 254.

Therefore, wavelength dispersion can be compensated for in all the channels of multi-wavelength light using the VIPA 240.

FIG. 17 is a graph showing the respective dispersion amounts of several channels of multi-wavelength light in the case where the thickness t is set to the thickness of the FSR of WDM matching. As shown in FIG. 17, the same dispersion is detected in all channels. However, the dispersion is not continuous between channels. Furthermore, the wavelength range of each channel, the dispersion in which the VIPA 240 compensates for can be set by properly setting the size of the mirror 254.

FIGS. 18A and 18B are similar to FIG. 15 in that they show the travel direction of the long wavelength 264, center wavelength 266 and short wavelength 268 of light emitted by the virtual image 260 of the beam waist 262.

According to FIG. 18A, the mirror 254 is convex. If a convex mirror is used, beam shift expands. Therefore, large chromatic dispersion can be obtained at a short focal length and at short intervals. If the mirror 254 is convex, as shown in FIG. 18A, convexity can be detected only from the side and cannot be detected from the top.

According to FIG. 18B, the mirror 254 is concave. If a concave mirror is used, the sign of dispersion is inverted. Therefore, abnormal dispersion is generated at a short focal length and at short intervals. If the mirror 254 is concave, as shown in FIG. 18B, the concavity can be detected only from the side and cannot be detected from the top.

Therefore, if the mirror 254 is viewed from the top, it appears to be planar. However, if the mirror 254 is viewed from side, it is convex or concave and it is one-dimensional.

In FIGS. 18A and 18B, the mirror 254 is located at or near the focal point of the focusing lens 252.

Therefore, as described above, for example, as shown in FIGS. 18A and 18B, the mirror 254 can be convex or concave if it is viewed from side. A convex mirror can promote wavelength dispersion, while a concave mirror can reduce wavelength dispersion or can invert it from negative (normal) to positive (abnormal). More specifically, a convex mirror can generate a large dispersion in the negative direction, while a concave mirror can generate a small dispersion in a positive direction or invert dispersion positively. This phenomenon can be realized by the fact that the strength of chromatic dispersion is equal to the function of the curvature of a mirror that is viewed from side.

FIG. 19 is a graph showing the output angle of optical flux of the VIPA 240 of the wavelength of the optical flux. As clear from FIG. 19, wavelength against output angle is not linear.

Since the relationship between wavelength and the output angle of optical flux generated by a VIPA is not linear, wavelength dispersion is not uniform in one wavelength band, as long as a planar mirror, an ordinary convex mirror or an ordinary concave mirror is used for the mirror 254. The non-linearity of wavelength dispersion is considered to be higher-order dispersion.

Generally, the non-linearity of wavelength dispersion of a device shown in FIGS. 18A and 18B can be expressed as follows.

$$(\text{Angular dispersion}) \cdot (1 - f \cdot (1/R)) \propto \text{wavelength dispersion} \quad (3)$$

where
f: The focal length of a focusing lens 252, and
R: The radius of curvature of the mirror 254.

FIG. 20 is a graph showing the angular dispersion of the VIPA 240 of the wavelength of optical flux. Generally, the curved line 284 shown in FIG. 20 shows the tilt of the curved line 282 shown in FIG. 19. As clear from FIG. 20, angular dispersion is not uniform. Instead, angular dispersion varies with wavelength.

Figure 21:
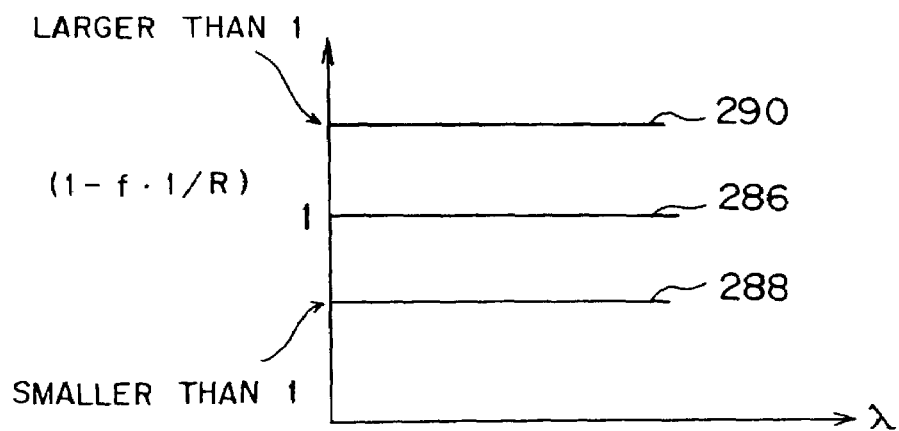
FIG. 21 shows the respective effects of different types of mirrors used as a device using a VIPA according to one preferred embodiment of the present invention.

FIG. 21 is a graph showing the portion $(1-f \cdot (1/R))$ of mathematical expression (3) of wavelength. More specifically, the straight line 286 is the graph of $(1-f \cdot (1R))$ of wavelength in the case of a concave mirror (the curvature radius is "+"). The straight line 290 is the graph of $(1-f \cdot (1/R))$ of wavelength in the case of a convex mirror (the curvature radius is "−"). As shown in FIG. 21, each mirror has a specific radius of curvature.

FIG. 22 is a graph showing the wavelength dispersion of the wavelength of a device as shown in FIGS. 18A and 18B. In this case, the mirror 254 is a general spherical convex mirror, plane mirror or spherical concave mirror. More specifically, a curved line 292 represents the wavelength dispersion of wavelength in the case of a convex mirror. A curved line 294 represents the wavelength dispersion of wavelength in the case of a plane mirror. A curved line 296 represents the wavelength dispersion of wavelength in the case of a concave mirror.

Generally, each of the curved lines 292, 294 and 296 represents the respective production of the angular dispersion shown in FIG. 20 and a proper straight line shown in FIG. 21 that is expressed by mathematical expression (3). More specifically, generally, the curved line 294 represents the product of the curved line 284 shown in FIG. 20 and the straight line 286 shown in FIG. 21. Generally, the curved line 294 represents the product of the curved line 284 shown in FIG. 20 and the straight line 290 shown in FIG. 21. The curved line 296 represents the product of the curved line 284 shown in FIG. 20 and the straight line 288 shown in FIG. 21.

As clear from FIG. 22, even if a spherical convex mirror, planar mirror or spherical concave mirror is used for the mirror 254, wavelength dispersion is not uniform.

Such a wavelength dependency of wavelength dispersion can be reduced or eliminated by chirping the curvature of the mirror 254.

Figure 24:
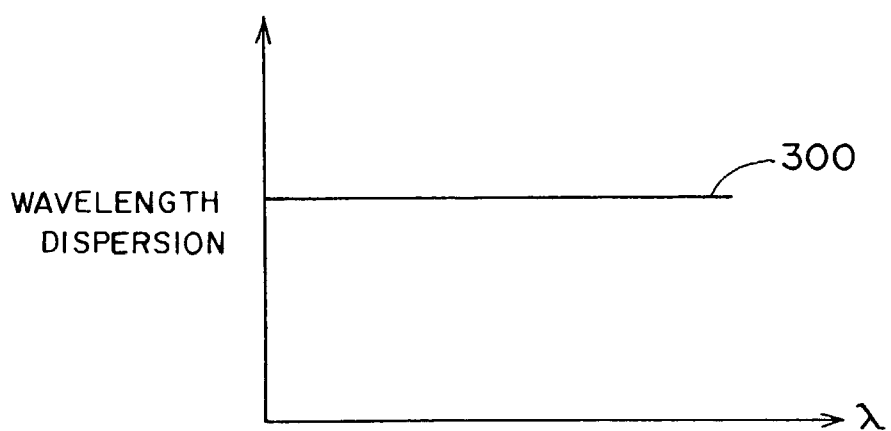
FIG. 24 shows the uniform chromatic dispersion of a device using a VIPA according to one preferred embodiment of the present invention.

Furthermore, FIG. 23 is a graph showing the curved line 298 of $(1-f \cdot (1/R))$ of mathematical expression (3) of wavelength. Generally, the curved line 298 shown in FIG. 23 is obtained by inverting the curved line 284 shown in FIG. 20. Therefore, as shown by the curved line 300 shown in FIG. 24, a mirror with the characteristic shown in FIG. 23 generates uniform wavelength dispersion.

Figure 25:
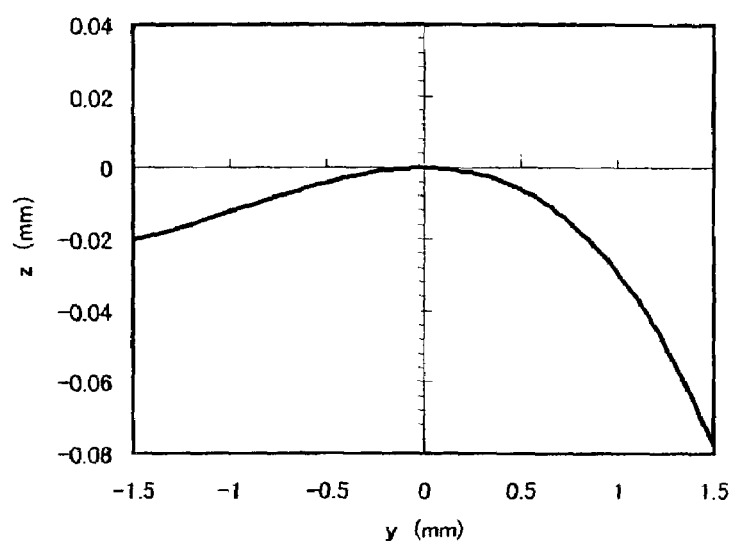
FIG. 25 shows an example of the sectional shape of a mirror for a device using a VIPA according to the preferred embodiment of the present invention.

For example, FIG. 25 shows an example of the shape (section) of a dispersion mirror in which the value of mathematical expression (3) is constant and the wavelength dispersion value is 2000 ps/nm. As clear from FIG. 25, the shape of the mirror is a free curved plane. A VIPA and a mirror are located in such a way that the angular dispersion of the VIPA can be in parallel with this section. In this case, in order to obtain a specific value (for example, −2000 ps/nm) of wavelength dispersion, it is acceptable if as shown in FIG. 26, the shape of the mirror takes the same shape (that is, cylindrical) in a direction perpendicular to this section. However, since light is focused in the direction perpendicular to the section by a lens regardless of wavelength, there is no need for the distance in the direction perpendicular to the section to be long.

In the preferred embodiments of the present invention described above, practical and large wavelength dispersion compensation can be made by using a VIPA with a large angular dispersion. Dispersion in all the channels of multi-wavelength light can also be simultaneously compensated for by setting the thickness of the VIPA to the thickness of the FSR of WDM matching. Furthermore, the wavelength dependency of wavelength dispersion can be reduced, that is, wavelength dispersion can be made almost uniform by forming the shape of a mirror into an optimal free curved shape.

Figure 5:
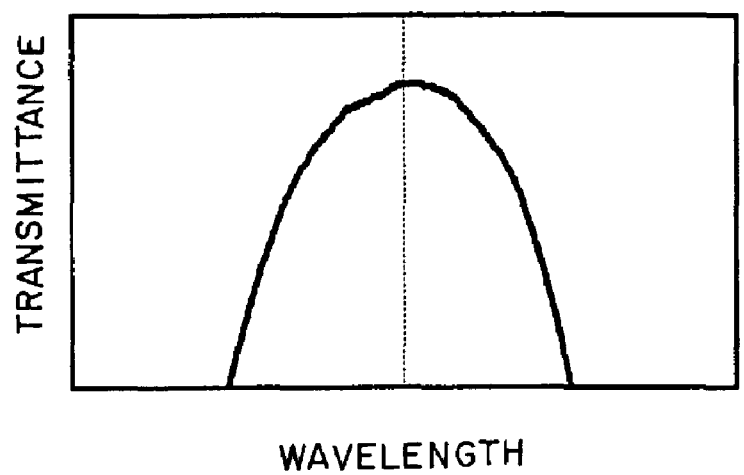
FIG. 5 shows the transmission characteristic of the device using a VIPA.

However, in the preferred embodiments of the present invention described above, when light passes through a device using a VIPA, the light takes a round top characteristic with a peak around the center wavelength in a continuous transmission wavelength band, as shown in FIG. 5, instead of a preferable flat wavelength transmittance characteristic.

In order to improve this characteristic, the device using a VIPA according to the preferred embodiment of the present invention comprises means for generating optical path deviation with a size varying depending on wavelength in a direction perpendicular to an angular dispersion direction generated by the VIPA in light returned to the VIPA after being reflected off the free-curved-surface mirror described above. In this case, the respective optical paths of a plurality of pieces of light with a different wavelength each are in parallel with one another.

Figure 27A:
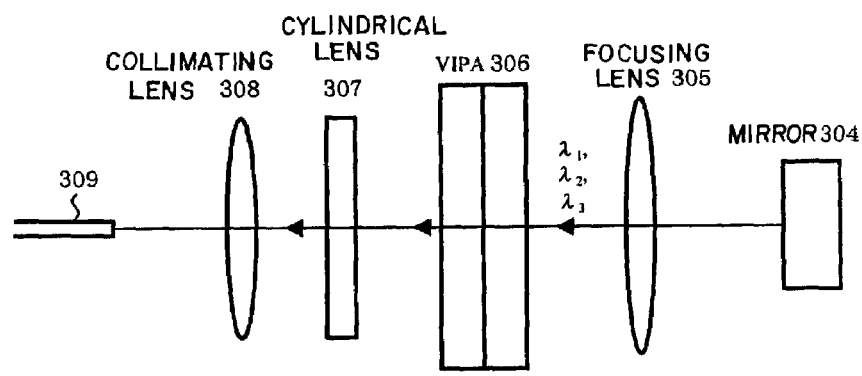
FIGS. 27A and 27B show the axis of light with each wavelength of the device using a VIPA, the side view of which is shown in FIG. 14 and which is viewed from top.
Figure 27B:
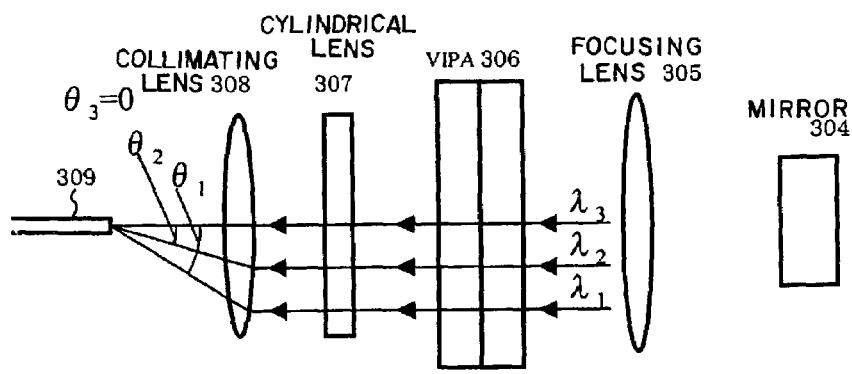

FIG. 27 is the top view of the device using a VIPA generating the chromatic dispersion shown in FIG. 14. Each straight line shown in FIG. 27 represents the optical axis (after being reflected off a reflection mirror) of light with each wavelength. If a cylindrical mirror as shown in FIG. 26 is used for a reflection mirror in the configuration shown in FIG. 14, as shown in FIG. 27A, the respective optical axes of a plurality of wavelengths output from an output fiber 309 are the same. When this optical axis and the optical axis of the output fiber 309 are the same, the coupling efficiency with the output fiber is maximized. Specifically, light input from the output fiber 309 to a collimating lens 308 is converted into parallel light by the collimating lens 308, is collected in the shape of line by a cylindrical lens 307 and is input to a VIPA 306. Then, light with each wavelength to which angular dispersion is applied by the VIPA 306, is collected at a mirror 304 by a focusing lens 305. The light collected at the mirror 304 is reflected off the mirror 304, is returned to the focusing lens 305 and is input to the cylindrical lens 307 through the VIPA 306. The light is converted into parallel rays by the cylindrical lens 307, travels back to the collimating lens 308 and is coupled with the output fiber 309. In this case, light with each wavelength is coupled with the output fiber 309 with equal coupling efficiency. However, in this case, if as shown in FIG. 27B, the respective optical axes of a plurality of pieces of light each with a different wavelength can be shifted by a respective amount according to wavelength in a direction perpendicular to the optical axis, in parallel with one another, angles $\theta_1$, $\theta_2$ and $\theta_3$ formed by the optical axis formed when the light is input to the output fiber 309 and the optical axis of the output fiber 309 vary depending on wavelength. If an angle formed by the optical axis of light input to a fiber and the axis of the fiber are different, the coupling efficiency of light with the fiber degrades. This degradation amount in coupling efficiency increases in proportional to the angle deviation. Therefore, in the device using a VIPA according to the preferred embodiment, coupling efficiency with an output fiber varies depending on wavelength. Specifically, a preferable flat transmission characteristic can be obtained by controlling the optical path shit for each wavelength and applying a characteristic, the reverse of the transmission characteristic of a device using a VIPA obtained when there is no such an optical path shift (in such a way that the coupling loss of light with high transmittance, of a device using a VIPA can increase and the coupling loss of light with low transmittance can decrease).

A specific means for generating the optical path deviation is described below using examples.

Figure 28:
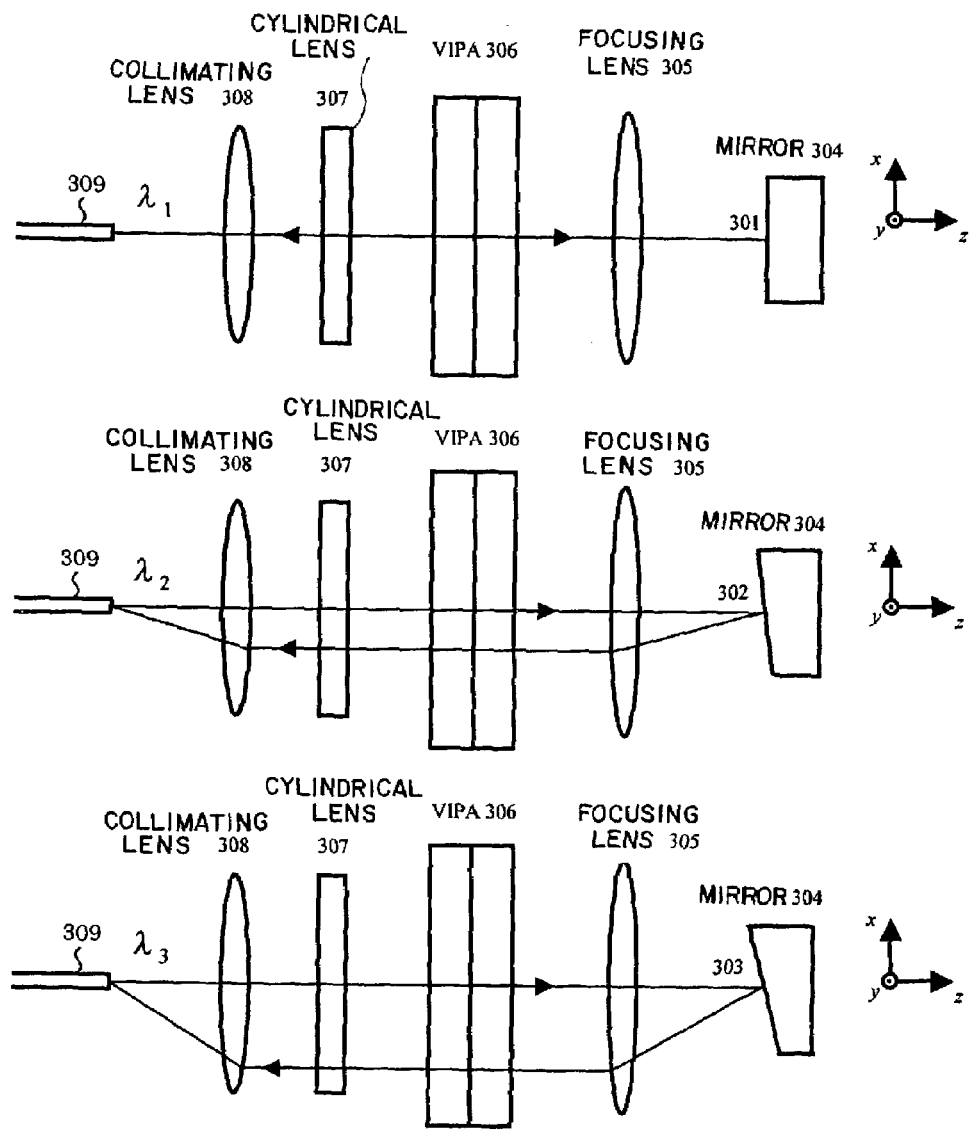
FIG. 28 is the top view of a device using a VIPA, using a mirror generating large optical path deviation varying according to wavelength, according to one preferred embodiment of the present invention.

FIG. 28 shows the configuration of the preferred embodiment of the present invention. In this preferred embodiment, the optical path deviation is generated by modifying the shape of the free-curved-surface mirror from a cylindrical one to one where the shape also varies in a direction where there is no shape change in the case of a cylindrical one. In FIG. 28, the same reference numbers are attached to the same constituent components as those shown in FIG. 27, and their descriptions are omitted.

According to FIG. 28, a plurality of pieces of light each with a different wavelength emitted in different directions by a VIPA $\lambda_1$, $\lambda_2$ and $\lambda_3$ are focused on different positions 301, 30 and 303, respectively of a mirror 304 by a focusing lens. Reference numbers 301, 302 and 303 represent different positions of the same mirror 304. Points, to which a plurality of pieces of light each with a different wavelength are consecutively arrayed on a mirror and form straight lines in the y direction in FIG. 28. However, the shape of the mirror along those straight lines generates almost uniform wavelength dispersion regardless of wavelength. Furthermore, a reflection angle in the direction perpendicular to the angular dispersion direction of a VIPA (reflection angle on the xz plane shown in FIG. 28) can be changed depending on wavelength by using a mirror in a shape, in which the tilt in a direction perpendicular to this straight line (x direction shown in FIG. 28) can change along this straight line (y axis). This reflected light takes an optical path in parallel with the travel direction of light output from the VIPA (z direction shown in FIG. 28) and deviated in a direction perpendicular to the angular dispersion direction (x direction shown in FIG. 28) when returning to the VIPA after passing through a focusing lens. In this way, optical path deviation varying according to wavelength can be generated.

Although in FIG. 28, optical path deviation is generated to the lower section of this figure, it can also be generated to the upper section of this figure. Alternatively, each piece of optical path deviation can be generated in a direction varying according to wavelength, for example, one piece of optical path deviation is generated upward by one wavelength and another piece of deviation is generated downward by another wavelength. The point is that light is input to the end of an optical fiber with an appropriate angle so that it can be coupled with an optical fiber with an appropriate coupling efficiency.

FIG. 29 shows the coupling efficiency of light at the end of an optical fiber.

If light output from an optical fiber and light input to it are both Gaussian beams, the coupling efficiency applied when there is angle deviation in light returning to the optical fiber can be expressed as follows.

$$\eta = \kappa \cdot \exp[-\kappa \cdot \pi^2 \theta^2 (w_1^2 + w_2^2)/(2\lambda^2)]$$

where $$\kappa = 4/\{(w_1/w_2 + w_1/w_2^2)\}$$

$w_1$: The beam waist radius of light output from an optical fiber, $w_2$: The beam waist radius of light input from an optical fiber, $\lambda$: Wavelength, and $\theta$: Angle deviation amount.

For the details of the coupling of an optical fiber and light, see "The Fundamentals and Applications of an Optical Coupling System for Optical Devices" by Kenji Kono.

FIG. 30 shows the relationship between an angle deviation amount and coupling efficiency. According to FIG. 30, it can be found that if a coupling angle deviates by 2 degrees, coupling efficiency degrades by 2 dB or more. FIG. 30 assumes that $w_1 = w_2 = 10$ μm and $\lambda = 1.55$ μm.

FIG. 31 shows the relationship between mirror tilt and coupling efficiency.

If in an optical system as shown in FIG. 31, the parameters are assumed to be as follows:

Focal length of collimating lens $f_c = 10$ mm,

Focal length of focusing lens $f_m = 80$ mm, and

Tilt angle of mirror $\theta_m = 0.1°$, the horizontal deviation of an optical axis and the angle deviation θ of light returning to an optical fiber are approximately 0.28 mm and approximately 0.80°, respectively. Therefore, in this case, coupling efficiency is approximately 92% (−0.35 dB).

FIG. 32A shows one example of the free-curved-surface mirror generating optical path deviation varying depending on wavelength that is used in this preferred embodiment. The coordinate axes shown in FIG. 32A correspond to those shown in FIG. 28. It is not difficult to produce such a three-dimensional free-curved-surface mirror using the current processing technology. Such a mirror can be produced by processing a metal, such as aluminum, brass, etc., using a three-dimensional processing machine with a diamond bit and a precise movable stage. Since such a cutting-processed mirror generally is very expensive, it is recommended to produce the mirror by preparing a metal mold with the inverted shape of a required shape, copying and molding it into a mirror with plastics, low-melting point glass, sol/gel glass, etc., and coating a metal, such as gold, aluminum, etc., or dielectric multi-film on the mirror. Besides, such a three-dimensional shape can also be obtained by ion beam etching and using resists with different thickness each.

FIG. 32B shows examples (calculation results) of the respective transmission characteristics of a device using a VIPA obtained when a transmission band is leveled using a mirror in the shape shown in FIG. 32A and when the conventional cylindrical mirror is used (before leveling). As shown in FIG. 32B, a round-top transmission characteristic can be improved into a preferable flat characteristic using such a mirror.

Although in the preferred embodiments described above, the wavelength dispersion compensation amount generated by a device using a VIPA is limited to one dispersion compensation amount determined by the mirror shape in the y direction shown in FIGS. 28 and 32A, according to another preferred embodiment of the present invention, another such device can generate a plurality of wavelength dispersion compensation amounts. Therefore, a device using a VIPA producing a flat transmission characteristic when generating each dispersion compensation amount can be realized.

Figure 33:
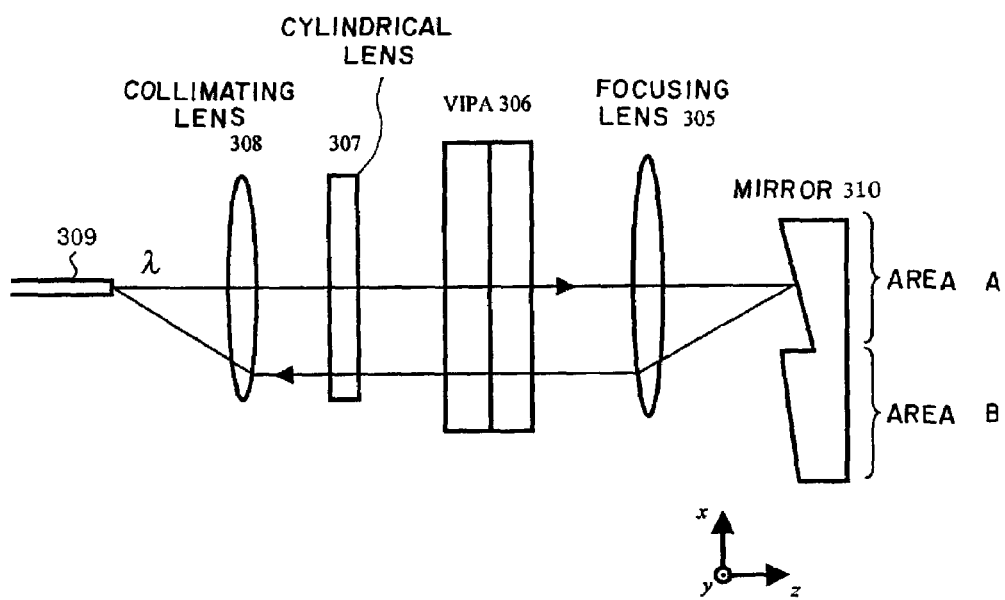
FIG. 33 is the top view of a device using a VIPA, with a plurality of mirror areas with the shape shown in FIG. 32, according to one preferred embodiment of the present invention.

FIG. 33 shows the configuration of another preferred embodiment of the present invention. In FIG. 33, the same reference numbers are attached to the same constituent components as those shown in FIG. 27, and their descriptions are omitted. According to FIG. 33, a mirror 310 comprises a plurality of areas (areas A and B). A mirror shape along one straight line in parallel with angular dispersion direction generated by a VIPA (y direction) of each area is designed to generate a different dispersion compensation amount. Furthermore, the tilt in a direction perpendicular to a straight line along the straight line of each area (tilt in the x direction along the y direction) is determined in such a way that the transmission characteristic of the VIPA is flat when generating each dispersion compensation amount. This preferred embodiment comprises a mechanism for switching over the area of the mirror 310 used according to a required dispersion compensation amount. Therefore, a device using a VIPA generating a plurality of dispersion compensation amounts and producing a flat transmission characteristic can also be realized. Although in FIG. 33, the mirror 310 comprises two areas A and B, it can also comprise three or more areas. FIG. 33 shows only the optical axis of light with a specific wavelength λ and a mirror shape in a position that the light with this wavelength hits (shape in the x direction).

For the mechanism switching the area of the mirror used, for example, the mirror 310 can be mounted on a stage, and the position of the mirror 310 can be mechanically shifted. Since for such a stage, many known means can be used, their detailed descriptions are omitted here.

Furthermore, according to another preferred embodiment of the present invention, a device using a VIPA that can set an arbitrary value in a specific range as a dispersion compensation amount and that generates a flat transmission characteristic even if any dispersion compensation amount in the specific range is set, can be realized.

Figure 34:
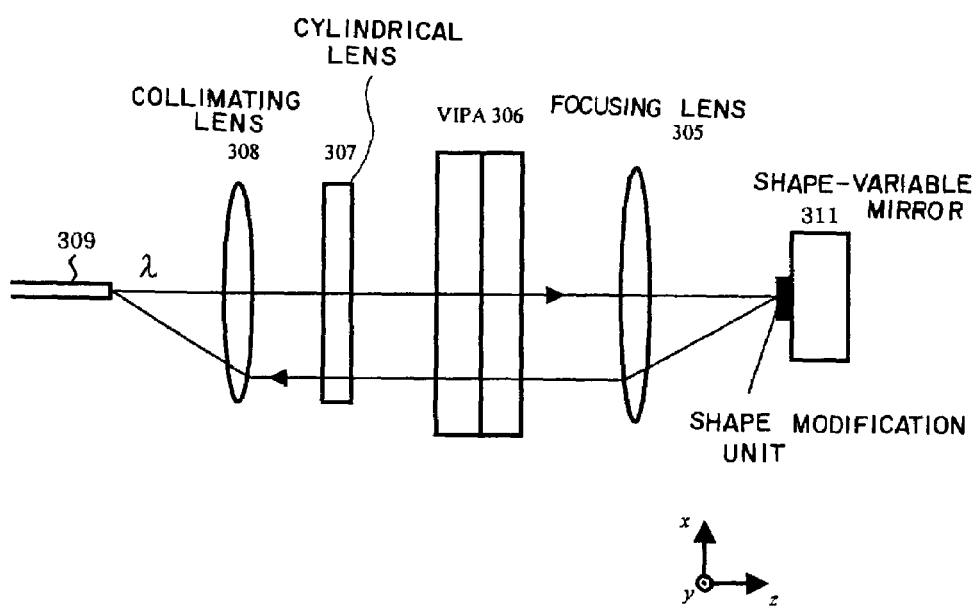
FIG. 34 is the top view of a device using a VIPA, with a shape-variable mirror, according to one preferred embodiment of the present invention.

FIG. 34 shows the configuration of such a preferred embodiment. In FIG. 34, the same reference numbers are attached to the same constituent components as those shown in FIG. 33, and their descriptions are omitted. According to FIG. 34, in this preferred embodiment, for the free-curved-surface mirror, a shape-variable mirror forming an arbitrary three-dimensional shape is used. The mirror shape is controlled so as to meet the following requirements. Firstly, a shape along one straight line in parallel with the angular dispersion direction (y direction) generated by a VIPA, of the mirror can generate a desired dispersion compensation amount. Furthermore, the tilt in a direction perpendicular to a straight line along this straight line (tilt in the x direction along the y direction) can produce a flat VIPA transmission characteristic when generating the dispersion compensation amount. Controlling so as to form such a mirror shape, a flat output optical characteristic can be obtained when generating the arbitrary dispersion compensation amount.

For a description of a shape-variable mirror, see the specification of Japanese Patent Application No. 2001-216415 as an example.

Figure 35:
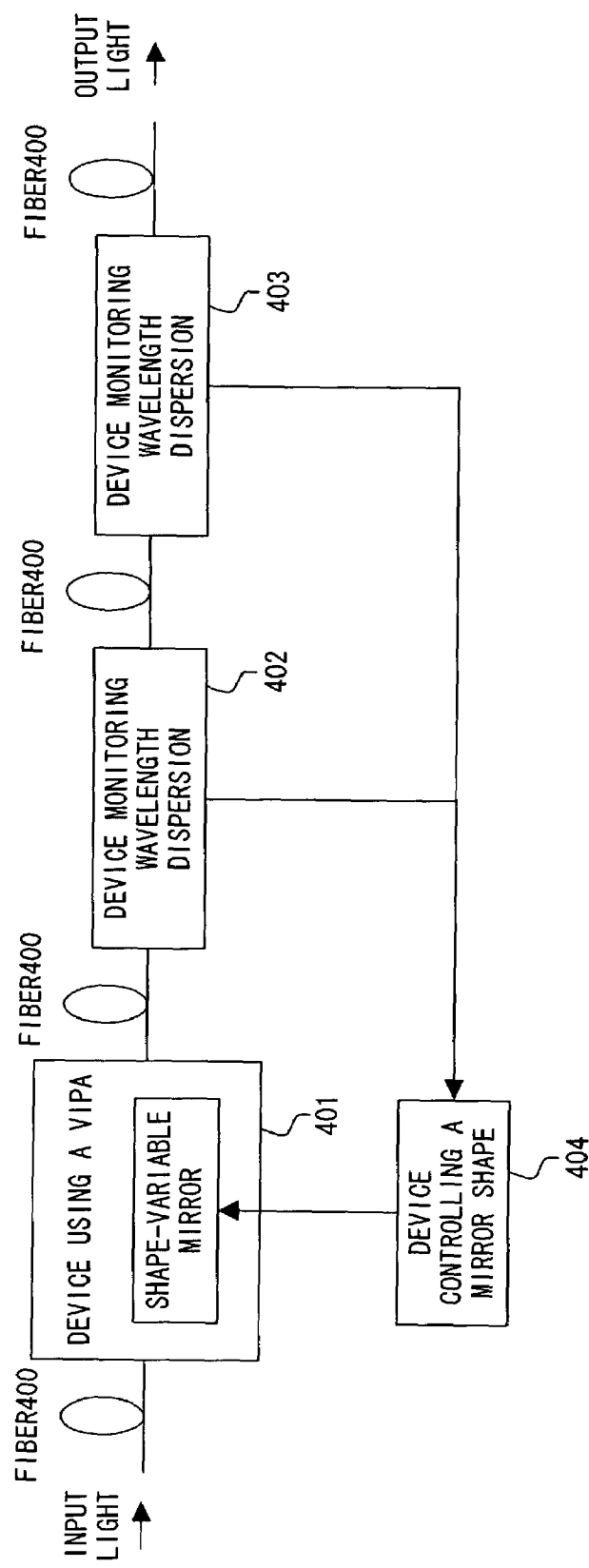
FIG. 35 shows the configuration of a system in which a device using a VIPA and a device monitoring wavelength dispersion and transmission characteristic are combined, according to one preferred embodiment of the present invention.

FIG. 35 shows the configuration of a system obtained by combining a device using a VIPA provided with a shape-variable mirror and a device monitoring the dispersion characteristic and transmission characteristic of light output from the VIPA.

In this way, a system controlling a mirror shape in such a way that the dispersion characteristic and transmission characteristic of output light can always be optimal, can be realized. Since in such a system, the influence of the change in the dispersion amount of a transmission line fiber due to a change with the passage of time of environmental temperature and the like cannot be neglected, such a system is useful for a superhigh-speed fiber optic communication system that always requires dispersion compensation.

In the system shown in FIG. 35, light received through a fiber transmission line 400 is output to the transmission line 400 through a device 401 using a VIPA with a shape-variable mirror. Then, each of the monitor devices 402 and 403 monitors wavelength dispersion. Then, a device 404 controlling the mirror shape converts the monitored value into a driving signal for the shape-variable mirror and supplies the signal to the shape-variable mirror. In this way, the wavelength characteristic of the VIPA is optimized.

Although in the preferred embodiments described above, the tilt of a mirror in a direction perpendicular to an angular dispersion direction generated by the VIPA generates the optical path deviation of light returning to the VIPA, means for generating such an optical path deviation is not limited to this, and another means can also be used.

Although in the preferred embodiments described above, by generating an optical path deviation with a size varying according to wavelength, in parallel with the optical path of light output from the VIPA in light returning to the VIPA, coupling efficiency with an output fiber is modified depending on wavelength and wavelength is leveled, optical path deviation in parallel with the light output from the VIPA is not necessarily generated, and instead, angle deviation with a size varying according to wavelength can be generated. The coupling efficiency with the output fiber also degrades due to angle deviation, and the wavelength characteristic can be leveled accordingly.

Figure 4:
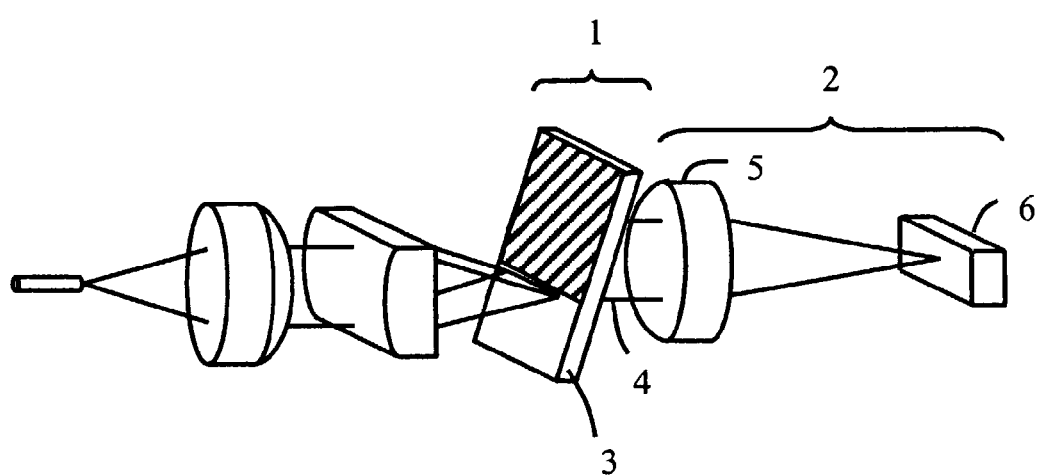
FIG. 4 shows a device compensating for wavelength dispersion using a VIPA.

In the preferred embodiment, output light, the wavelength dispersion of which is compensated for, can be extracted by inserting the same circulator as shown in FIG. 1 in front of the fiber shown in FIG. 4.

In the preferred embodiment of the present invention, the VIPA also has a reflective film in order to reflect light. For example, FIG. 8 shows a VIPA 76 with reflective films 122 and 124 for reflecting light. However, the use of a VIPA is not required to have a film in order to provide a reflector plane. Although a VIPA has to have an appropriate reflector plane, the plane need not be a film.

In the preferred embodiment of the present invention, the VIPA also comprises a transparent glass plate for generating multiple reflection. For example, FIG. 8 shows the VIPA 76 provided with a transparent glass plate 120 having reflective films. However, the separation of reflective films in the VIPA 76 is not limited to the use of a glass material or an arbitrary type of plate. Instead, the reflective films can be separated by a type of spacer. For example, the reflective films of the VIPA can be separated by "air" instead of inserting a glass plate. Therefore, it can be described that the reflective film is separated by a transparent material, such as optical glass, air and the like.

The operation of a VIPA varies depending on the refractive index and thickness of the material inserted between the reflector planes of the VIPA. Furthermore, the operating wavelength of the VIPA can also be accurately adjusted by controlling the temperature of the VIPA.

As described above, according to the preferred embodiment of the present invention, a device generating almost uniform wavelength dispersion regardless of wavelength and simultaneously performing the compensation of wavelength dispersion actually accumulated in an optical fiber in the multi-wavelength area of a multi-channel can be provided and a desired wavelength characteristic of transmittance can be obtained. Therefore, in the preferred embodiments of the present invention, the configuration is not limited to a specific one. For example, a VIPA can also have a radiation window, and the reflection on each surface of a VIPA is not limited to a specific example.

Although in the preferred embodiments described above, examples of positively applying wavelength dispersion are given, the present invention can also be used as a transmission-band filter device for multi-wavelength channel providing a desired transmission wavelength characteristic in the multi-wavelength of a multi-channel assuming that wavelength dispersion is almost zero. For example, the wavelength characteristic of a device with a non-flat transmission wavelength characteristic, such as an array waveguide type multiplexer/demultiplexer (AWG) and the like can also be improved. In particular, the preferred embodiment shown in FIG. 31 can be used as a variable transmission-band filter device for a multi-wavelength channel, and the wavelength characteristic of a device with any transmission wavelength characteristic can be improved.

According to the present invention, the shape of the wavelength characteristic of a dispersion compensator with a VIPA can be modified from a round-top shape to a flat shape easily and at low cost.

What is claimed is:

1. A device, comprising:
    a virtually-imaged phased array (VIPA) with a plurality of transmission areas receiving/outputting light, receiving from an optical fiber an input light having different wavelengths via the transmission areas of the VIPA, dispersing the input light to produce output light angularly dispersed in a first plane at an angle based on the wavelengths of the input light and an interference order by multiple reflection in the VIPA;
    a lens collecting the output light generated by the VIPA;
    a mirror having a shape to allow application of almost uniform wavelength dispersion to the output light from the VIPA regardless of wavelength, returning the output light to the lens so that the output light of the interference order is returned to the VIPA with a returning angle in a second plane substantially perpendicular to the first plane, the returning angle corresponding to a coupling efficiency with the optical fiber to flatten transmission wavelength characteristics, and the output light being returned to the optical fiber via the transmission areas of the VIPA.

2. The device according to claim 1, wherein said generation of the optical path deviation with the size variation is via a mirror having a shape so as to apply a different reflection direction to each of a plurality of pieces of light with a different wavelength collected at a different position on the mirror by the lens in a direction perpendicular to the angular dispersion angle of the VIPA.

3. The device according to claim 2, wherein said mirror comprises a plurality of areas, each generating a different wavelength dispersion, and having a shape so as to apply a different reflection direction to each of a plurality of pieces of light with a different wavelength for each area in a direction perpendicular to the angular dispersion direction of the VIPA for spatially moving the mirror, and provides each of the plurality of pieces of light with a desired transmission wavelength characteristic by different wavelength dispersion by reflecting the light on a different area on the mirror.

4. The device according to claim 1, wherein
    an optical path deviation with a different size in a direction perpendicular to the angular dispersion direction of the VIPA is generated by a shape-variable mirror in a shape so as to apply a different reflection direction to each of the plurality of pieces of light with a different wavelength collected at a different position on the mirror by the lens, in a direction perpendicular to the angular dispersion direction of the VIPA, comprising a portion arbitrarily transforming the shape and means for controlling the shape,
    said mirror arbitrarily modifying wavelength dispersion and providing a desired transmission characteristic by modifying the optical path deviation amount in each wavelength dispersion.

5. A device, comprising:
    a virtually-imaged phased array (VIPA) with a plurality of transmission areas receiving/outputting light, receiving input light with each wavelength in a continuous wavelength range through each transmission area, dispersing the light at an angle varying depending on wavelength by multiply reflecting the input light, making a plurality of input light rays interfere with one another and generating output light spatially distinguishable from a light generated using in put light with another wavelength in the continuous wavelength range;
    a lens collecting the output light generated by the VIPA with an output angle varying depending on wavelength at a position varying depending on wavelength;
    a mirror having a shape to allow application of almost uniform wavelength dispersion to the light output from the VIPA in an angular dispersion direction generated by the VIPA regardless of wavelength, reflecting and returning the collected light to the lens that returns the reflected light to the VIPA, receiving the output light returned by the lens and reflected by the VIPA, multiply reflecting the output light in the VIPA and outputting the light from the VIPA through the plurality of transmission areas;
    a monitoring device that monitors the dispersion characteristic and wavelength characteristic of output light, said monitoring device reflecting a monitor result in a mirror shape and controlling the mirror shape in such a way to provide optimal dispersion characteristic and transmission characteristic, and
    wherein an optical path deviation is generated with a size variation based on wavelength in a direction perpendicular to the angular dispersion direction generated by the VIPA for each wavelength in the continuous wavelength range of the light returned to the VIPA from the mirror,
    a desired transmission wavelength characteristic is provided by coupling output light with an optical fiber having coupling efficiency varying depending on wavelength,
    an optical path deviation with a different size in a direction perpendicular to the angular dispersion direction of the VIPA is generated by a shape-variable mirror in a shape so as to apply a different reflection direction to each of the plurality of pieces of light with a different wavelength collected at a different position on the mirror by the lens, in a direction perpendicular to the angular dispersion direction of the VIPA, comprising a portion arbitrarily transforming the shape and means for controlling the shape, and said mirror arbitrarily modifying wavelength dispersion and providing a desired transmission characteristic by modifying the optical path deviation amount in each wavelength dispersion.

6. A device, comprising:

a virtually-imaged phased array (VIPA) receiving a substantially parallel input light from an optical fiber, emitting part of the input light during each reflection and generating an optical flux with a propagation direction varying depending on wavelengths of the input light by generating an angular dispersion to produce the optical flux in a first plane at an angle based on wavelengths of the input light and an interference order by multiple reflection in the VIPA;

a mirror reflecting the optical flux output from the VIPA, inputting the optical flux of the interference order to the VIPA with a returning angle in a second plane substantially perpendicular to the first plane, the returning angle corresponding to a coupling efficiency with the optical fiber to flatten transmission wavelength characteristics; and returning the optical flux via the transmission areas of the VIPA to the optical fiber.

7. The device according to claim 6, wherein said coupling efficiency modification includes realizing a shape of a reflection plane of said mirror by reflecting the optical flux input to the mirror to reflect the optical flux in a direction outside the angular dispersion direction of the VIPA.

8. The device according to claim 7, wherein the shape of the reflection plane of a mirror is modified by a difference in a propagation delay applied to the optical flux.

9. The device according to claim 8, wherein said mirror is produced by uniting a plurality of mirrors each with a different reflection plane.

10. The device according to claim 8, wherein the shape of the reflection plane of said mirror can be modified as requested.

11. A device, comprising:

a virtually-imaged phased array (VIPA) receiving collected light, emitting part of the light during each reflection and generating optical flux with a propagation direction varying depending on wavelength by generating angular dispersion by interference with the emitted light rays;

a mirror reflecting the optical flux output from the VIPA in a prescribed direction inside the angular dispersion direction for each wavelength, inputting the optical flux to the VIPA and applying specific propagation delay for each wavelength when the optical flux is output from the VIPA, a shape of a reflection plane of a mirror being modified by a difference in a propagation delay applied to the optical flux and as requested; and where efficiency modification is coupled for applying optical path deviation varying depending on wavelength to the optical flux reflected off the mirror, modifying coupling efficiency in the case where the optical flux is output from the VIPA and is coupled at an optical fiber by adjusting the angle of optical flux input to the optical fiber, and said coupling efficiency modification including realizing a shape of a reflection plane of said mirror by reflecting the optical flux input to the mirror to reflect the optical flux in a direction outside the angular dispersion direction of the VIPA, and the shape of said mirror is modified in accordance with a result of monitoring the influence of wavelength dispersion on an optical signal after the signal is output from said device and propagates through an optical fiber.

12. A method of compensating chromatic dispersion using a virtually-imaged phased array (VIPA) with a plurality of transmission areas, comprising:

receiving from an optical fiber an input light having different wavelengths across each of the plurality of transmission areas of the VIPA;

dispersing the input light to produce output light angularly dispersed in a first plane at an angle based on the wavelengths of the input light and an interference order by multiple reflection of the input light in the VIPA;

returning the output light of the interference order to the VIPA with a returning angle in a second plane substantially perpendicular to the first plane, the returning angle corresponding to a coupling efficiency with the optical fiber to flatten transmission wavelength characteristics; and returning the output light through the plurality of transmission areas to the optical fiber.

13. A method of generating chromatic dispersion using a virtually-imaged phased array (VIPA) having transmission areas, comprising:

receiving from an optical fiber an input light having different wavelengths via the transmission areas of the VIPA;

dispersing the input light to produce output light angularly dispersed in a first plane at an angle based on the wavelengths of the input light and an interference order by multiple reflection in the VIPA;

returning the output light of the interference order to the VIPA with a returning angle in a second plane substantially perpendicular to the first plane, the returning angle corresponding to a coupling efficiency with the optical fiber to flatten transmission wavelength characteristics; and returning the output light via the transmission areas of the VIPA to the optical fiber.

14. A device for generating a chromatic dispersion, comprising:

a virtually-imaged phased array (VIPA) having transmission areas receiving an input light and producing a first output light with a first angular dispersion dependent on wavelength in a first plane; and a mirror reflecting the first output light with a substantially similar interaction order onto the virtually-imaged phased array to produce a second output light with a second angular dispersion dependent on the wavelength in a second plane perpendicular to the first plane.

* * * * *

UNITED STATES PATENT AND TRADEMARK OFFICE
CERTIFICATE OF CORRECTION

PATENT NO. : 7,200,297 B2 Page 1 of 1
APPLICATION NO. : 10/278868
DATED : April 3, 2007
INVENTOR(S) : Yasuhiro Yamauchi et al.

It is certified that error appears in the above-identified patent and that said Letters Patent is hereby corrected as shown below:

Column 24, Line 35, change "in put" to --input--.

Signed and Sealed this

Twenty-sixth Day of June, 2007

JON W. DUDAS
*Director of the United States Patent and Trademark Office*